United States Patent
Yoon et al.

(10) Patent No.: US 8,885,109 B2
(45) Date of Patent: Nov. 11, 2014

(54) DISPLAY DEVICE FOR DISPLAYING META DATA ACCORDING TO COMMAND SIGNAL OF REMOTE CONTROLLER AND CONTROL METHOD OF THE SAME

(75) Inventors: Yimkyong Yoon, Seoul (KR); Jeonga Shin, Seoul (KR); Chetan Chindupuragi Sadashivan, Bangalore (IN); Siva Krishna Vunnam, Bangalore (IN); Vijay Rachabattuni, Bangalore (IN); Byungsoo Kim, Seoul (KR); Eunji Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/561,952

(22) Filed: Jul. 30, 2012

(65) Prior Publication Data

US 2013/0088648 A1 Apr. 11, 2013

(30) Foreign Application Priority Data

Oct. 5, 2011 (KR) .................. 10-2011-0101014

(51) Int. Cl.
| | | |
|---|---|---|
| H04N 5/44 | (2011.01) | |
| H04N 7/16 | (2011.01) | |
| H04N 5/445 | (2011.01) | |
| G06F 3/00 | (2006.01) | |
| G06F 13/00 | (2006.01) | |
| H04N 5/783 | (2006.01) | |
| H04B 1/06 | (2006.01) | |
| G06F 3/033 | (2013.01) | |
| G09G 5/08 | (2006.01) | |
| H04N 21/422 | (2011.01) | |
| H04N 21/431 | (2011.01) | |
| H04N 21/4722 | (2011.01) | |
| H04N 21/478 | (2011.01) | |

(52) U.S. Cl.
CPC ...... *H04N 21/4316* (2013.01); *H04N 21/42202* (2013.01); *H04N 21/4722* (2013.01); *H04N 21/47815* (2013.01); *H04N 21/42222* (2013.01)
USPC ............. 348/734; 725/135; 725/39; 386/349; 455/352; 345/158

(58) Field of Classification Search
None
See application file for complete search history.

(56) References Cited

U.S. PATENT DOCUMENTS

| | | | | |
|---|---|---|---|---|
| 2005/0059378 | A1* | 3/2005 | Kim ............................. | 455/352 |
| 2005/0132420 | A1* | 6/2005 | Howard et al. ............... | 725/135 |
| 2008/0253737 | A1* | 10/2008 | Kimura et al. ................. | 386/68 |
| 2009/0249393 | A1* | 10/2009 | Shelton et al. ................. | 725/39 |
| 2010/0171698 | A1* | 7/2010 | Kim et al. ..................... | 345/158 |
| 2011/0025925 | A1* | 2/2011 | Hansen ......................... | 348/734 |

FOREIGN PATENT DOCUMENTS

EP 2 056 596 A1 5/2009

* cited by examiner

*Primary Examiner* — Jeffrey Harold
*Assistant Examiner* — Sean Haiem
(74) *Attorney, Agent, or Firm* — Birch, Stewart, Kolasch & Birch, LLP

(57) ABSTRACT

A method of controlling a display device, and which includes receiving, via a receiving device, video data and meta data corresponding to the video data from an external source device; displaying, on a display of the display device, the received video data; receiving, via a controller, a motion command signal from a remote controller associated with the display device; and selectively displaying metadata corresponding to at least one object included in the displayed video data on the display in accordance with a particular motion of the remote controller identified by the motion command signal.

16 Claims, 24 Drawing Sheets

(a)  (b)

(a)  (b)

(a)

(b)

(c)

(d)

(a)

(b)

(a)  (b)  (c)

(a)            (b)

DISPLAY DEVICE FOR DISPLAYING META DATA ACCORDING TO COMMAND SIGNAL OF REMOTE CONTROLLER AND CONTROL METHOD OF THE SAME

This application claims the benefit of Korean Patent Application No. 10-2011-0101014, filed on Oct. 5, 2011, which is hereby incorporated by reference as if fully set forth herein.

BACKGROUND OF THE INVENTION

1. Field of the Invention

The present invention relates to a display device for displaying meta data according to a command signal of a remote controller and a control method of the same, and more particularly, to a display device for adjusting a display order or the transparency of meta data included in video data displayed in the display device using a remote controller and displaying the meta data, thereby providing a convenient user interface, and a control method of the same. Examples of the display device include a network television (TV), a smart TV, a hybrid broadcast broadband television (HBBTV), an Internet TV, a web TV, and an Internet protocol television (IPTV).

2. Discussion of the Related Art

Broadcasting stations now provide video on demand (VOD) services allowing subscribers, i.e. viewers, to decide what broadcast content they want to watch and at what time instead of a provider-centered one-way service. The VOD service is also used in remote medical treatment, remote education, Internet broadcasting, work from home, and home shopping as well as existing televisions (TV) and video recorders.

A real-time transmission type service is also provided, e.g. a VOD streaming service. In more detail, the streaming service is a technology for reproducing audio, video, or animation on the Internet in real time. Before the streaming service, video files had to be downloaded to hard disks before they could be reproduced on a corresponding terminal. However, the streaming service reproduces such video files in real time. Further, because the video files are not downloaded and stored on hard disks when streaming, the user can not copy such video files. Consequently, the risk of infringing a copyright of video files is reduced. For this reason, the streaming service has been widely used at Internet broadcasting sites in recent years.

In connection with the VOD streaming service, Internet content-based service providing sites provide advertisement content to users simultaneously with the provision of a content service. This is because content service providers generally receive benefits from advertising revenue, and not from the provision of content.

In addition, the advertisement content is generally provided before the provision of the content service. In this instance, users have to wait for the reproduction of content which they want to watch and watch advertisements although they may not want to watch such advertisements. Also, when users want to obtain information regarding goods or music which they take interest in during reproduction of the content, an additional retrieval process must be performed.

Also, when users view advertisements regarding goods during reproduction of the content, the users are often exposed to unnecessary advertisements, which decreases the advertisement efficiency. In addition, the users are unintentionally exposed to advertisements. Furthermore, when the users view an advertisement during reproduction of the content, the content is hidden by the advertisement which inconveniences the user.

SUMMARY OF THE INVENTION

Accordingly, one object of the present invention is to provide a display device and method for displaying meta data according to a command signal of a remote controller that substantially obviate one or more problems due to limitations and disadvantages of the related art.

Another object of the present invention is to provide a user interface allowing a user to confirm whether meta data including an advertisement is included in content displayed in a display device through a simple motion using a remote controller.

Still another object of the present invention is to provide a user interface that can adjust the display order, amount, and the transparency of meta data included in displaying through a simple motion using a remote controller.

Another object of the present invention is to define a data transmission protocol between a remote controller and a display device for adjusting the display order, amount, and the transparency of meta data included in content through a motion using the remote controller.

A further object of the present invention is to provide a user interface that can store meta data included in content and conveniently viewing the stored meta data through a motion using a remote controller.

To achieve these objects and other advantages and in accordance with the purpose of the invention, as embodied and broadly described herein, the present invention provides in one aspect a method of controlling a display device, and which includes receiving, via a receiving device, video data and meta data corresponding to the video data from an external source device; displaying, on a display of the display device, the received video data; receiving, via a controller, a motion command signal from a remote controller associated with the display device; and selectively displaying metadata corresponding to at least one object included in the displayed video data on the display in accordance with a particular motion of the remote controller identified by the motion command signal.

In another aspect, the present invention provides a display device including a receiving device configured to receive video data and meta data corresponding to the video from an external source device; a display configured to display the received video data; and a controller configured to receive a motion command signal from a remote controller associated with the display device, and selectively display metadata corresponding to at least one object included in the displayed video data on the display in accordance with a particular motion of the remote controller identified by the motion command signal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Suffixes "module" and "unit" of components used in the following description are given merely to easily make this specification. The "module" and "unit" may be mingled with each other.

Meanwhile, a display device described in this specification includes an intelligent network TV having a computer supporting function as well as a broadcast receiving function. As an Internet function is added to the display device in addition to a broadcast receiving function, the display device may include an interface which can be more conveniently used than a writing type input device, a touchscreen, or a space remote controller. Also, the display device may be connected to the Internet or a computer using a wired or wireless Internet function so that emailing, web browsing, banking, and gaming functions can be performed. For such various functions, a standardized general-purpose operating system (OS) may be used.

In the display interface according to an embodiment of the present invention, therefore, various applications may freely be added or removed, for example, on a general-purpose OS kernel, and therefore, it is possible to perform various user-friendly functions.

Figure 1:
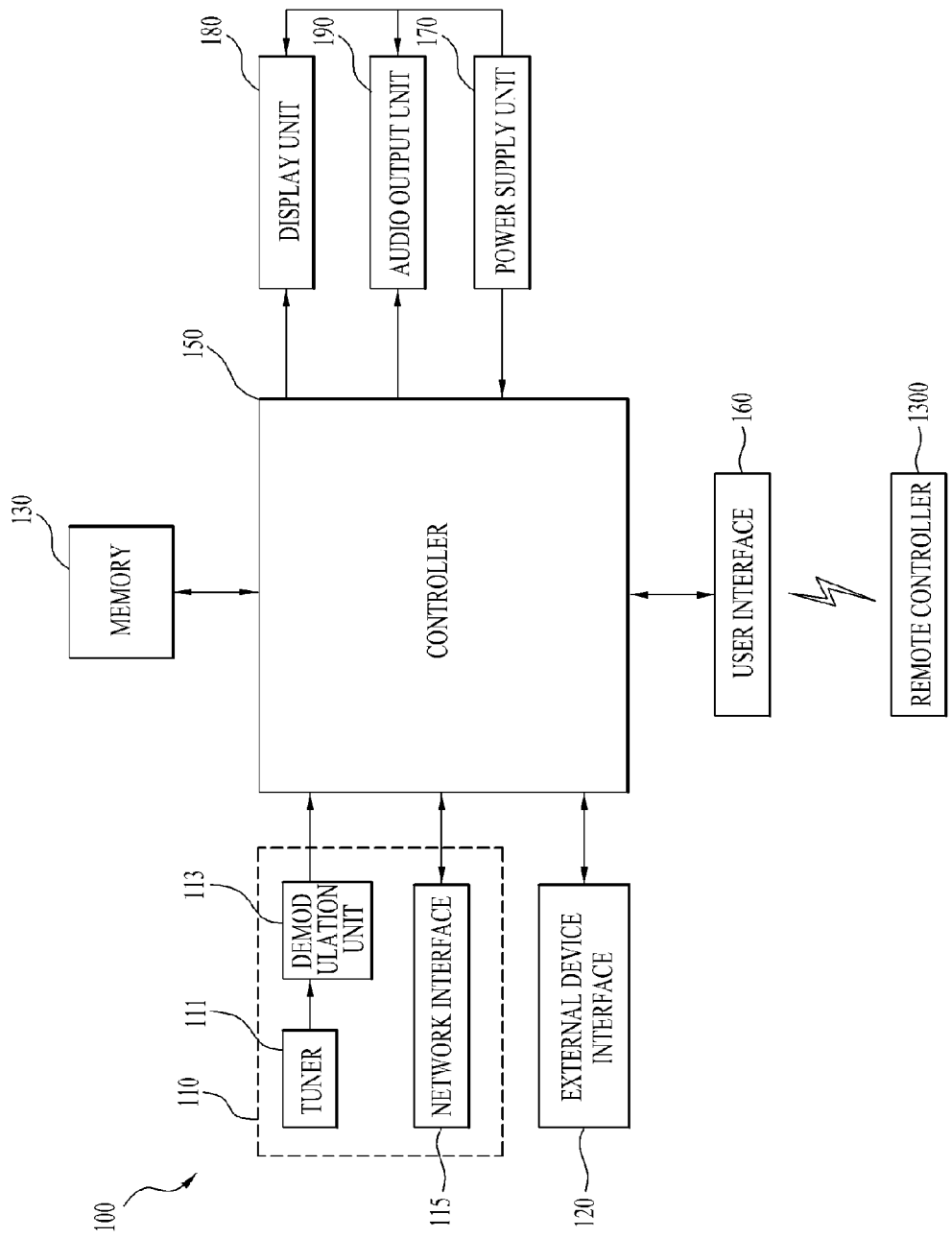
FIG. 1 is a block diagram illustrating a display device according to an embodiment of the present invention.

FIG. 1 is a block diagram illustrating a display device 100 according to an embodiment of the present invention. Some modules may be deleted from, or new modules may be added to FIG. 1, as needed by those skilled in the art. As shown in FIG. 1, the display device 100 includes a broadcast receiving unit 110, a network interface 115, an external device interface 120, a memory 130, a controller 150, a user interface 160, a power supply unit 170, a display unit 180, and an audio output unit 190.

The broadcast receiving unit 110 may include a tuner 111, a demodulation unit 113, and the network interface 115. The broadcast receiving unit 110 may also be designed so that the broadcast receiving unit 110 includes the tuner 111 and the demodulation unit 113, but does not include the network interface 115 as needed. On the contrary, the broadcast receiving unit 110 may be designed so that the broadcast receiving unit 110 includes the network interface 115, but does not include the tuner 111 and the demodulation unit 113.

Further, the tuner 111 selects a radio frequency (RF) broadcast signal corresponding to a channel selected by a user or all stored channels among RF broadcast signals received by an antenna. The demodulation unit 113 then receives and demodulates a digital IF signal (DIF) converted by the tuner 111. A stream signal output from the demodulation unit 113 may be input to the controller 150. After demultiplexing and video/audio signal processing, the controller 150 outputs a video to the display unit 180 and audio to the audio output unit 190.

The network interface 115 may include, for example, an Ethernet terminal for connection with a wired network. Also, the network interface 115 may use communication standards, such as wireless LAN (WLAN) (Wi-Fi), wireless broadband (Wibro), world interoperability for microwave access (Wimax), high speed downlink packet access (HSDPA), for connection with a wireless network. The network interface 115 can also select and receive a desired one of the applications opened to the public through a network.

In addition, the external device interface 120 can connect an external device to the display device 100. To this end, the external device interface 120 may include an A/V input and output unit or a wireless communication unit. Thus, the external device interface 120 can be connected to an external device, such as a digital versatile disk (DVD) player, a Blu-ray disc (BD) player, a game machine, a camera, a camcorder, or a computer (laptop computer), in a wired or wireless fashion. Also, the external device interface 120 can receive an application or application list from an adjacent external device and transmit the received application or application list to the controller 150 or the memory 130.

The memory 130 may be realized by an electrically erasable programmable read-only memory (EEPROM). The memory 130 can also store a program for processing and controlling signals in the controller 150 or a signal-processed video, audio, or data signal. Also, the memory 130 can function to temporarily store the video, audio, or data signal input from the external device interface 120 or the network interface 115. In addition, the memory 130 can store an application or application list input from the external device interface 120 or the network interface 115.

Further, the user interface 160 transmits a signal input by a user to the controller 150 or a signal from the controller 150 to the user. For example, the user interface 160 can receive and process a control signal, such as power on/off, channel selection, or screen setting, or transmit a control signal from the controller 150 to a remote controller 1300 according to various communication modes, such as a radio frequency (RF) communication mode or an infrared (IR) communication mode.

The display unit 180 converts a video signal, a data signal, or an on screen display (OSD) signal processed by the controller 150 or a video signal or a data signal received by the external device interface 120 into red (R), green (G), and blue (B) signals to generate a drive signal. The display unit 180 may be realized by a plasma display panel (PDP), a liquid crystal display (LCD), an organic light emitting diode (OLED), a flexible display, or a three-dimensional (3D) display.

The audio output unit 190 receives an audio processed signal, such as a stereo signal, a 3.1 channel signal, or a 5.1 channel signal, from the controller 150, and outputs the received signal as an audio. The audio output unit 190 may be realized by various types of speakers.

The power supply unit 170 supplies power to the display device 100. For example, the power supply unit 170 can supply power to the controller 150, which may be configured in the form of a system on chip (SOC), the display unit 180 for displaying a video, and the audio output unit 190 for outputting an audio.

In addition, the remote controller 1300 transmits a user input to the user interface 160. To this end, the remote controller 1300 may use a Bluetooth, radio frequency (RF) communication, infrared (IF) communication, ultra wideband (UWB), or ZigBee mode. Also, a motion of the remote controller 1300 can be sensed, and the sensed motion transmitted to the display device 100 as a command signal. The remote controller 1300 will be described in more detail below with reference to FIGS. 16 and 17.

Hereinafter, the display device 100 for displaying meta data according to a command signal of the remote controller will be described. In more detail, the external device interface 120 receives video data and meta data from an external source device, and the display unit 180 displays the received video data. Here, the external source device may include a terrestrial or cable broadcasting server, a content server, and a content-related advertisement providing server as examples.

The video data is content-related data provided by a broadcasting server. The video data includes digital data provided through various kinds of wired and wireless communication networks as well as movies, dramas, music videos, and games. The video data can also be received through a video on demand (VOD) service.

Further, the meta data includes advertisement data, content data, guidance data, and supplemental data regarding an object predetermined for each frame of the video data as examples. Thus, a thing, such as a person, place, or commodity, including meta data contained in video data for advertising to users or providing detailed information to the users is called an object. Meta data is also stored in the memory 130 so as to be matched with each object included in the video data. Consequently, all things, such as a place, music, person, and commodity, which can be displayed by video data can be an object. Meta data, such as supplemental data and guidance data, regarding the object may also be stored in the memory 130.

For example, when the object is a commodity, meta data corresponding to the object may include a commodity name, price, and store. Also, when the object is a work product, such as a book or music, the meta data may include a title, author, price, and store. When the object is a place, such as a hotel or restaurant, the meta data may include a shop name, location, telephone number, and home page address. Further, the meta data may include graphic data for displaying data contained therein. In addition to object-related information, the meta data may include supplemental information and link information of the video data.

Meanwhile, advertisement markets have grown with the extension of content markets. In particular, the TV audience tends to purchase clothes, bags, and shoes worn by the leading actors and actresses in movies or dramas. Actually, such goods are frequently sold out.

When meta data regarding a specific person, place, and commodity related to content are provided simultaneously with the provision of the content, and not before and after the provision of the content, a user can immediately view information of his/her favorite commodity while the content is displayed. In addition, the user can even purchase his/her favorite commodity, which is very convenient.

Also, an advertiser or a content provider can better advertise to the public, thereby improving advertisement efficiency. Consequently, the memory 130 can match at least one object included in video data with meta data regarding the object and store the matched data for each frame of the video data.

Further, the display unit 180 displays the received video data, and the user interface 160 receives at least one command signal from the remote controller 1300. At this time, the controller 150 can control a range within which the meta data is displayed (a meta data display range) to be changed according to change of the received command signal.

Controlling the change meta data display range includes changing an amount of meta data to be displayed so as to change a display region of the meta data displayed on a screen and changing a display order of meta data so as to change an amount of the meta data to be displayed. Further, The command signal received from the remote controller 1300 includes a motion signal corresponding to a movement of the remote controller 1300 in a predetermined pattern and a selection signal for selecting a specific region in the displayed video data.

The controller 150 can determine whether an object is present in a region selected by the selection signal, and upon determining that the object is present, display meta data corresponding to the object, which will be described below with reference to FIG. 10.

Figure 2:
FIG. 2 is an overview illustrating displaying content before and after displaying an object in the display device according to an embodiment of the present invention.

Next, FIG. 2 is an overview illustrating displaying content before and after displaying an object in the display device according to an embodiment of the present invention. In particular, FIG. 2(*a*) is an overview illustrating displaying content before displaying an object. When content is reproduced, an object is not displayed at all. When a user wants to know information regarding a specific commodity or place included in the content, however, such information can be displayed.

When a command signal received by the user interface 160 corresponds to a first condition, the controller 150 displays an object having meta data in which the object having meta data is separated so that a user can know. That is, the controller 150 controls the display unit 180 to separately display a first region having the meta data and a second region not having the meta data.

Next, FIG. 2(*b*) is an overview illustrating displaying content after displaying an object. In the displayed video data, objects 210, 220, and 230 including meta data is a first region, which has a bold border. The remaining regions of the video data including no meta data is a second region, which is displayed without an additional mark.

The first condition is that the motion of the remote controller 1300 recognized by the controller 150 is a first motion. The first motion may be a specific motion selected among all motions that can be performed through the remote controller 1300. Consequently, the first motion may be moving the remote controller 1300 in the vertical direction, moving the remote controller 1300 in the horizontal direction, rotating the remote controller 1300 in the clockwise direction, or rotating the remote controller 1300 in the counterclockwise direction. Also, the first motion may be drawing a specific shape using the remote controller 1300. This will be described below with reference to FIG. 18.

Also, motion information set as the first motion may be stored in the memory 130, and the controller 150 can determine whether the motion information received from the user interface 160 corresponds to the stored motion information. For example, when shaking the remote controller is set as the first motion, and the user shakes the remote controller 1300, the controller 150 determines the corresponding motion is the first motion, and separately displays an object including meta data.

Further, the first condition may be a signal generated when a specific button of the remote controller 1300 is pushed. The first condition may also be changed according to preset information.

A method of separately displaying an object including meta data as a first region also includes displaying an object including meta data in a flickering fashion and displaying an object including meta data with a bold border. Further, a second region may be displayed using black and white, and only a first region including meta data may be displayed using a specific color.

As the object including the meta data is separately displayed as described above, a user can confirm whether there is information the user is interested in. When there is such information, the procedure advances to the next step. On the other hand, when there is no information, the user may continue to use the content. Further, to continue the use of content, displaying original video data without division between a first region and a second region may be additionally set. When corresponding to the set motion, the controller 150 can control the display unit 180 to display original video data.

As the object is separately displayed, the user does not have to watch an unnecessary advertisement. Further, an advertisement producer can advertise only to users who want to view the advertisement, thereby further improving the advertisement efficiency.

Meanwhile, upon determining that there is information which the user takes interest in, the user may want more detailed information. In the present invention, therefore, the user can view meta data through a simple motion using the remote controller 1300, thereby improving the user convenience.

Figure 3:
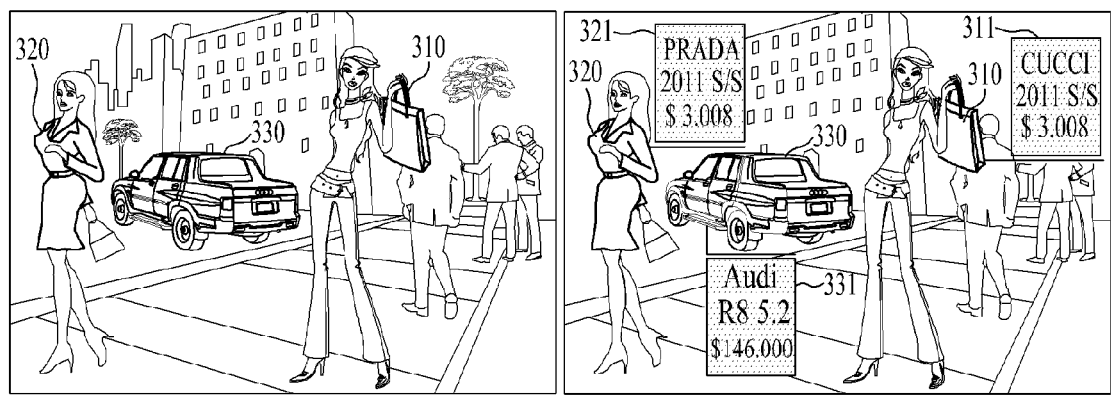
FIG. 3 is an overview illustrating recognizing a motion of a remote controller and displaying meta data in the display device according to an embodiment of the present invention.
Figure 3:
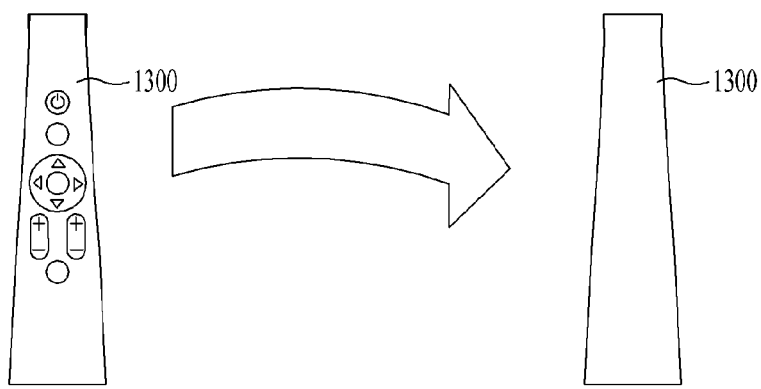

FIG. 3 is an overview illustrating recognizing a motion of the remote controller and displaying meta data in the display device according to an embodiment of the present invention. When the command signal received by the user interface 160 corresponds to a second condition, the controller 150 can control the display unit 180 to simultaneously display graphic data corresponding to meta data and the received video data.

As shown in FIG. 3(*a*), when objects 310, 320, and 330 included in video data is separately displayed, i.e. a first region and a second region are separately displayed, and when a second motion is performed using the remote controller 1300, meta data 311, 321, and 331 of the respective objects are simultaneously displayed as shown in FIG. 3(*b*).

Further, the second condition is moving the remote controller 1300 using a second motion. When the recognized motion is the second motion, graphic data corresponding to meta data of the object are displayed simultaneously with video data. Further, the second motion may be a specific motion selected among all motions that can be performed through the remote controller 1300. As shown in FIG. 3, the second motion may be rotating the remote controller 1300 about the middle thereof (a flip motion). In this instance, when a user rotates the remote controller 1300, the controller 150 recognizes the rotation of the remote controller 1300, i.e. the second motion, through the user interface 160.

As a result, the controller 150 displays graphic data corresponding to meta data included the graphic data simultaneously with the video data with reference to the memory 130. Also, the second motion is not limited to the motion of rotating the remote controller 1300 as described above. For example, the second motion may be moving the remote controller 1300 in the vertical direction, moving the remote controller 1300 in the horizontal direction, moving the remote controller 1300 is a zigzag fashion, or drawing a specific shape.

Also, motion information set as the second motion may be stored in the memory 130, and the controller 150 can determine whether the motion information received from the user interface 160 corresponds to the stored motion information so that the motion information can be recognized as the second motion. In addition, the second condition may be a signal generated when a specific button of the remote controller 1300 is pushed. The second condition may also be changed according to preset information.

Further, the remote controller 1300 includes a sensor for sensing a motion, such as rotation, of the remote controller 1300. Consequently, the motion of the remote controller 1300 may be recognized using a signal received by the user interface 1600 of the display device, which will be described below with reference to FIG. 17. Also, graphic data corresponding to the meta data may be displayed in an on screen display (OSD) mode.

In more detail, a screen displayed in the OSD mode is generally overlapped on original video information in an opaque fashion with the result that the lower screen of the overlapped portion cannot be viewed. In the present invention, therefore, the transparency of a portion on which meta data is displayed is adjusted to solve such a problem. In particular, such a problem can be solved by a simple motion of the user, thereby improving the user convenience.

That is, the meta data includes graphic data for displaying meta data. When the graphic data is displayed with content, i.e. video data, the graphic data hides a portion of the video data, by which the use of content is disturbed. For this reason, the controller may adjust the transparency of the graphic data.

Further, the controller 150 recognizes a motion of the remote controller 1300 using a signal received by the user interface 160, and controls the display unit 180 to adjust the transparency of meta data with respect to the object in response to the motion.

Figure 4:
FIG. 4 is an overview illustrating recognizing a motion of the remote controller and adjusting the transparency of meta data in the display device according to an embodiment of the present invention.
Figure 4:
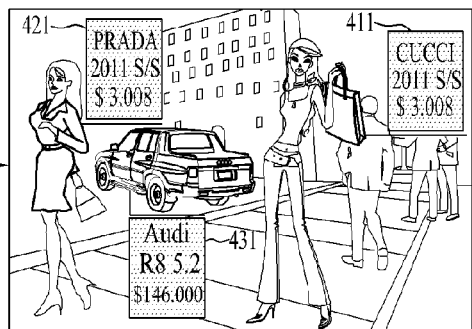
Figure 4:
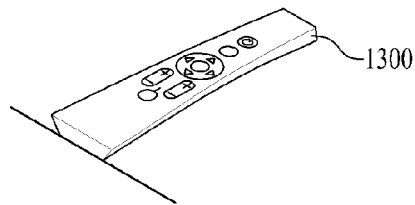
Figure 4:
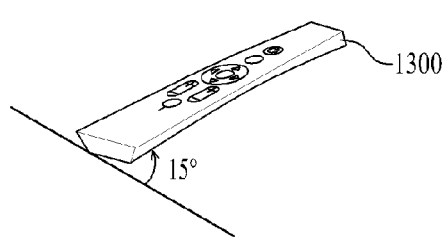
Figure 4:
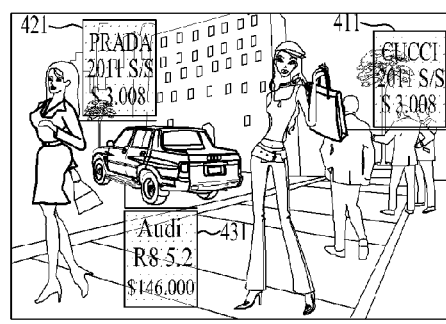
Figure 4:
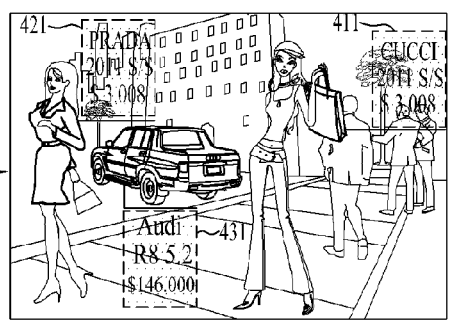
Figure 4:
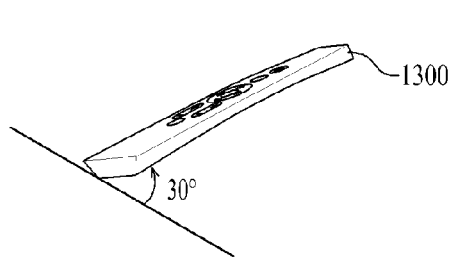
Figure 4:
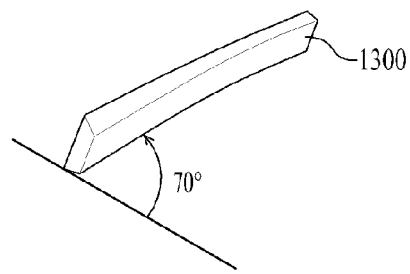

Next, FIG. 4 is an overview illustrating recognizing a motion of the remote controller and adjusting the transparency of meta data in the display device according to an embodiment of the present invention. In more detail, when a command signal received by the user interface 160 corresponds to a third condition, the controller 150 can change the transparency of the displayed meta data in response to the motion of the remote controller 1300.

The third condition is that the motion of the remote controller 1300 recognized by the controller 150 is a third motion. The third motion may be a specific motion selected from all motions that can be performed through the remote controller 1300. In addition, the transparency is adjusted in response to the third motion. Further, a motion that can adjust the transparency in a stepwise fashion is preferable.

FIG. 4(a) illustrates a first region 410, 420, and 420 including meta data and a second region including no meta data separately displayed in video data. When rotating the remote controller 1300 by a predetermined angle (e.g., 15 degrees) is set as the second motion, meta data 411, 421, and 431 are displayed by the second motion as shown in FIG. 4(b).

When rotating the remote controller 1300 in the counterclockwise direction is set as the third motion, the transparency is increased in proportion to the rotation angle of the remote controller 1300 as shown in FIG. 4(c). In FIG. 4(d), the rotation angle of the remote controller 1300 is 70 degrees. In this example, the transparency is higher than in FIG. 4(c), in which the rotation angle of the remote controller 1300 is 30 degrees.

As the rotation angle of the remote controller 1300 is increased as described above, the transparency of meta data is increased. Alternatively, the transparency of meta data may be decreased as the rotation angle of the remote controller 1300 is increased. Further, the rotation angle of the remote controller 1300 can be sensed by a gyro sensor provided in the remote controller 1300, and be received through the user interface 160, which will be described below with reference to FIG. 17.

In FIG. 4, meanwhile, the motion for rotating the remote controller 1300 about the middle thereof (the flip motion) was described as an embodiment. In addition to the flip motion, rotating a portion of the remote controller so that a pointer corresponding to the remote controller 1300 forms a circular pattern (a rotary motion) or moving the remote controller 130 so that the entire remote controller draws a circle (a circular motion) may be the third motion.

Figure 5:
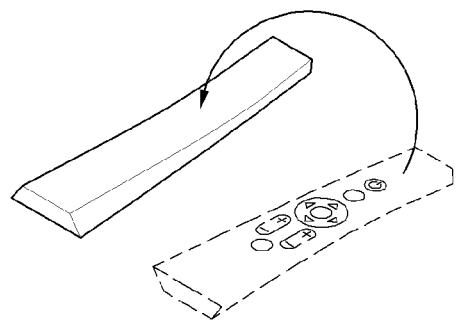
FIG. 5 is an overview illustrating a motion of the remote controller for receiving a command signal in the display device according to an embodiment of the present invention.
Figure 5:
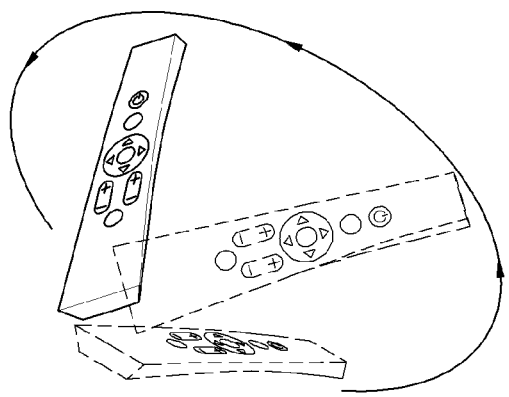
Figure 5:
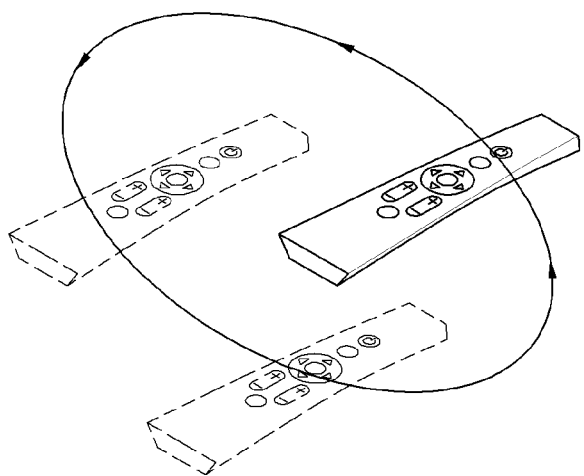

Next, FIG. 5 is an overview illustrating motions of the remote controller for inputting a command signal in the display device according to an embodiment of the present invention. In more detail, the display device can receive a signal generated in response to a motion of the remote controller as a command signal. For example, FIG. 5(a) illustrates rotating the remote controller about the middle thereof (a flip motion), FIG. 5(b) illustrates rotating the remote controller in a circle so that a pointer corresponding to the remote controller forms a circular pattern on the screen of the display device (a rotary motion), and FIG. 5(c) shows moving the remote controller so that the entirety of the remote controller draws a circle (a circular motion). Further, in FIG. 5(c), a pointer corresponding to the remote controller may also form a circular pattern on the screen of the display device. In particular, the motions shown in FIGS. 5(b) and 5(c) may be generated when the user moves his/her arm while holding the remote controller to draw a circular pattern.

Also, unlike those shown in FIGS. 4 and 5, rotating the remote controller 1300 in the clockwise direction may be set as the third motion. Further, in addition to the motion for rotating the remote controller about the middle thereof (the flip motion) as described above, the motions for drawing a circle using the remote controller 1300 (the rotary motions and the circular motion) may be set as the third motion. In addition, the rotation range of the third motion may be freely set to 180 degrees or 360 degrees.

Figure 6:
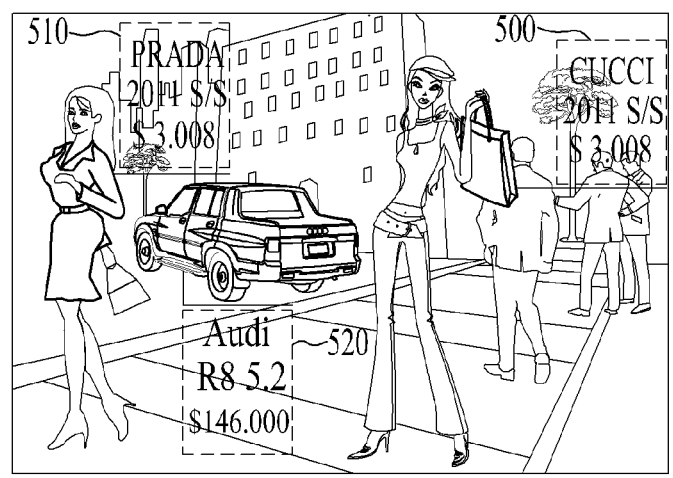
FIG. 6 is an overview illustrating meta data transparently displayed in the display device according to an embodiment of the present invention.

Next, FIG. 6 is an overview illustrating graphic data corresponding to meta data transparently displayed in the display device according to an embodiment of the present invention. When rotating the remote controller is set as the third motion, the remote controller can be rotated by the maximum range to transparently display graphic data 500, 510, and 520 corresponding to meta data so that video data overlapped with the graphic data can also be displayed.

In this way, the transparency of graphic data corresponding to the meta data can be increased through a simple motion using the remote controller 1300, thereby maximizing the user convenience. Also, when a user wants to continuously view meta data included in video data during a fashion drama, for example, the user can view two kinds of data.

Also, in FIG. 6, the graphic data corresponding to meta data is displayed so that the graphic data can be viewed even when the transparency is the maximum. In addition, transparently displaying graphic data so that only the video data can be viewed when the transparency is the maximum falls.

Figure 7:
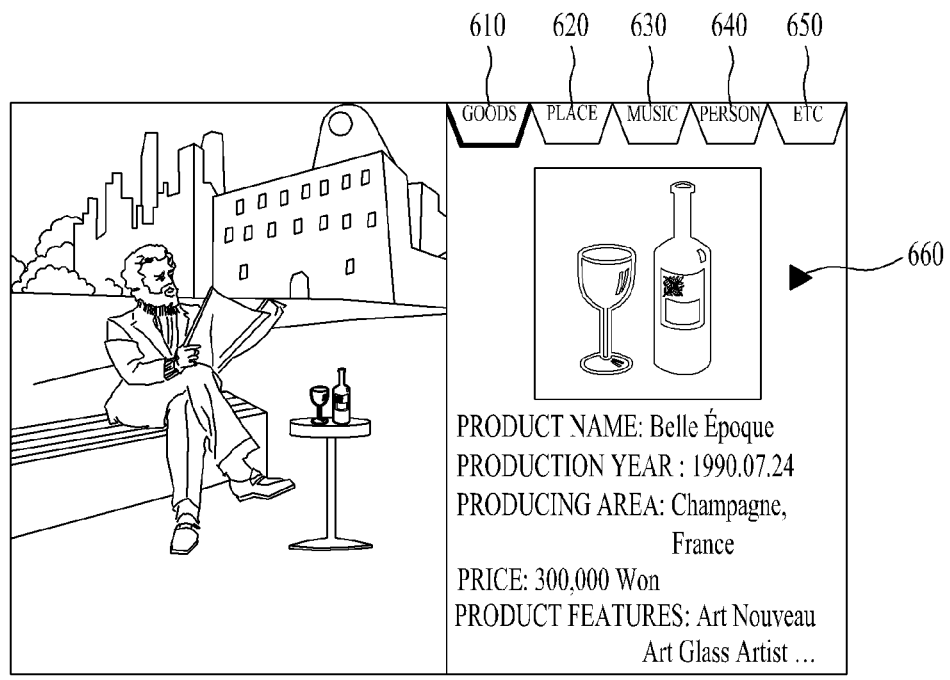
FIG. 7 is an overview illustrating displaying meta data at a separate region in the display device according to an embodiment of the present invention.

FIG. 7 is an overview illustrating displaying meta data at a separate region in the display device according to an embodiment of the present invention. Among displayed meta data, some meta data may be displayed at a separate region with respect to a specific object desired by a user.

More specifically, FIG. 7 is an overview illustrating a user performing a second motion while drama content is displayed with the result that meta data regarding a wine object included in the drama content are displayed separately from video data. As shown in FIG. 7, the meta data regarding the wine object includes a product name, production year, producing area, store, price, and product features. Therefore, the user can immediately see information about a product they are interested in simultaneously with the displayed content, thereby improving user convenience.

Further, the wine is a commodity and can be displayed at a commodity tab 610, and other meta data included in the displayed drama content can be displayed at a place tab 620, a music tab 630, a person tab 640, and an etc. tab 650. Also, when two or more commodities are present at the commodity tab 610, a separate or new page mark 660 may be provided in the commodity tab 610 so that the user can view meta data of the included commodity while turning pages.

In this way, the user can confirm an object included in content and meta data regarding the object, and view detailed information and even purchase the object. For example, the user can purchase the object by accessing an appropriately displayed page. The purchase page can be displayed as a separate page or the screen may be divided to display the details of meta data in detail.

Figure 8:
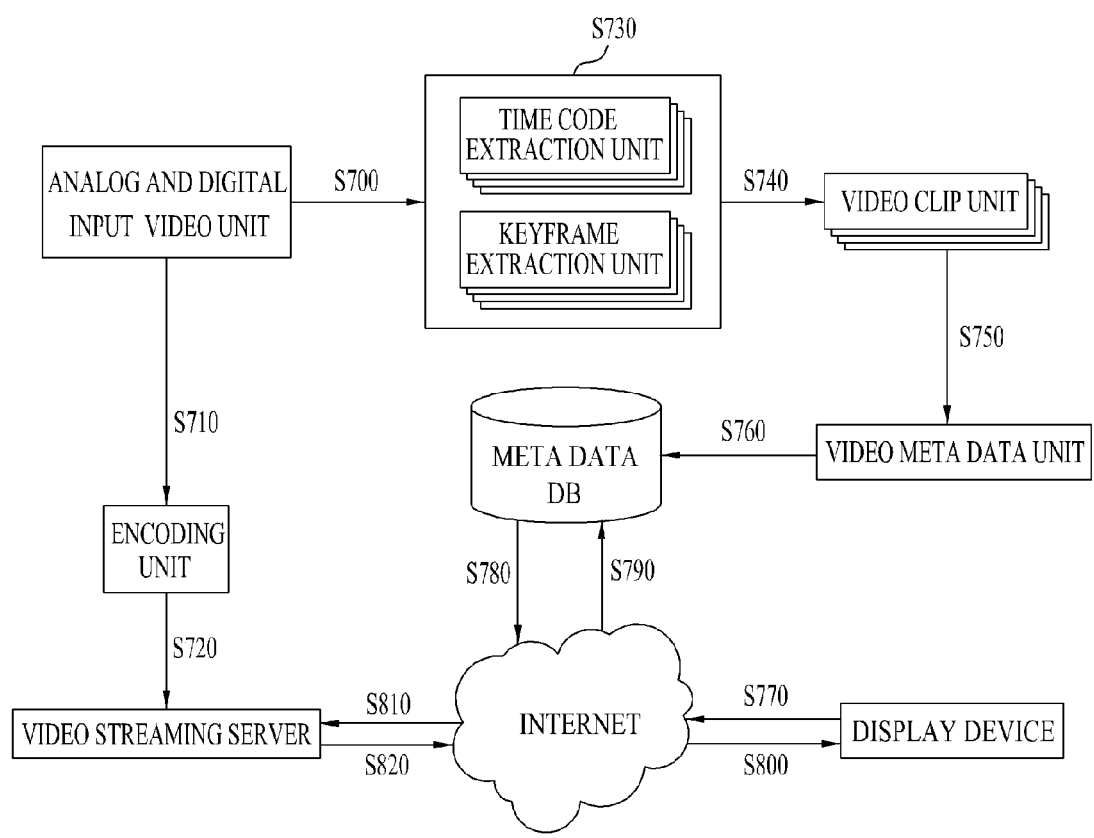
FIG. 8 is an overview illustrating a meta data registration system for providing meta data in the display device according to an embodiment of the present invention.

Next, FIG. 8 is an overview illustrating a meta data registration system for providing meta data in the display device according to an embodiment of the present invention. A time code extraction unit and a key frame extraction unit receive an encoded video source from an analog and digital input video unit (S700). The video source is also input to an encoding unit (S710), which encodes the video source into a digital video. The encoded digital video is stored in a video streaming server (S720).

Further, the time code extraction unit and the key frame extraction unit extract a time code and a key frame as video synopsis information for making video meta data (S730). As an example of extracting the key frame, a color difference between corresponding pixels of two successive frames may be calculated, and frames having a color difference exceeding a critical value may be detected.

The extracted time code and key frame are also combined on a per content basis to perform video clipping (S740). After video clipping, video meta data is stored in a video meta data unit (S750). Further, the video clip unit may perform video clipping according to the content of the key frame, and supplemental information of video may be inserted into the video clip unit. The video meta data unit may also store data of the video clip unit in the video meta data. Key frame information may also be stored so that the key frame information can be used as video meta data based on general commercial XML data.

Also, an object included in the video clip unit and meta data regarding the object can be stored in the video meta data. An additional database (DB) for storing object information and meta data regarding the object may be referred to. Further, an object ID can be created and managed so as to store and manage object information and meta data regarding the object.

In addition, the stored meta data is registered in a meta data database (DB) (S760). Users can also access a database management system (DBMS) of the video meta data through the Internet using the display device (S770) to retrieve registered videos (S780). The retrieved result (S790) is then displayed on the display device (S800).

Also, when a video reproduction request (S770) is made with respect to the retrieved result, the request is transmitted to the video streaming server (S810). As a result, a corresponding video clip is provided through a streaming service (S820), and then a video reproduction service (S800) is performed.

Through the video meta data registration process according to the embodiment of the present invention as described above, the user can receive a video and meta data of an object included in the video in the form of VOD using the display device. In this way, meta data is automatically synchronized with a content reproduction time, and resultant information includes meta data regarding an object which the user takes interest in during reproduction of content. Also, the meta data can be systematically managed through the meta data DBMS and content and meta data can simultaneously be provided through a database retrieval function.

Figure 9:
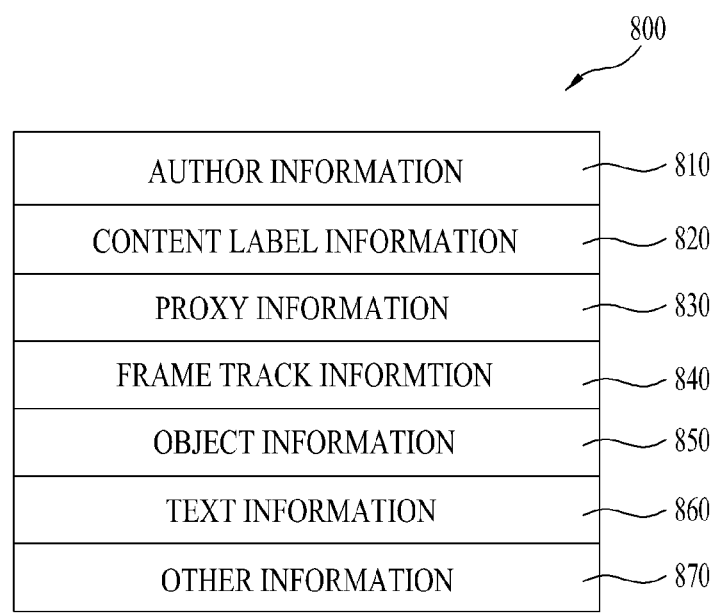
FIG. 9 is an overview illustrating a meta data hierarchy diagram used in the display device according to an embodiment of the present invention.

Next, FIG. 9 is an overview illustrating a meta data hierarchy diagram used in the display device according to an embodiment of the present invention. As shown, the meta data 800 may include author information 810 regarding a content author and content label information 820 for content classification, proxy information 830, i.e. information regarding at what bitrates a digital video has been encoded, at which position a digital video file is located, and at which position the streaming server is located, frame track information 840 including the meta data, object information 850 including object identification (ID) related to the meta data and supplemental information of the object, text information 860 such as description related to the object, and other information 870.

The text information may include link information related to the object and advertisement information. Also, the text information may have a separate structure for each type of object. For example, when the object is a commodity, the text information may include a commodity name, price, and store. When the object is a piece of work, such as a book or music, the text information may include a title, author, price, and store. Also, when the object is a place, such as a hotel or restaurant, the text information may include a shop name, location, telephone number, and home page address.

Also, upon receiving a selection signal for selecting a specific region in the displayed video data from the remote controller 1300, the controller 150 determines whether an object is present in the region selected by the selection signal. Upon determining that an object is present in the region selected by the selection signal, the controller 150 can display the meta data corresponding to the object on the display unit.

Figure 10:
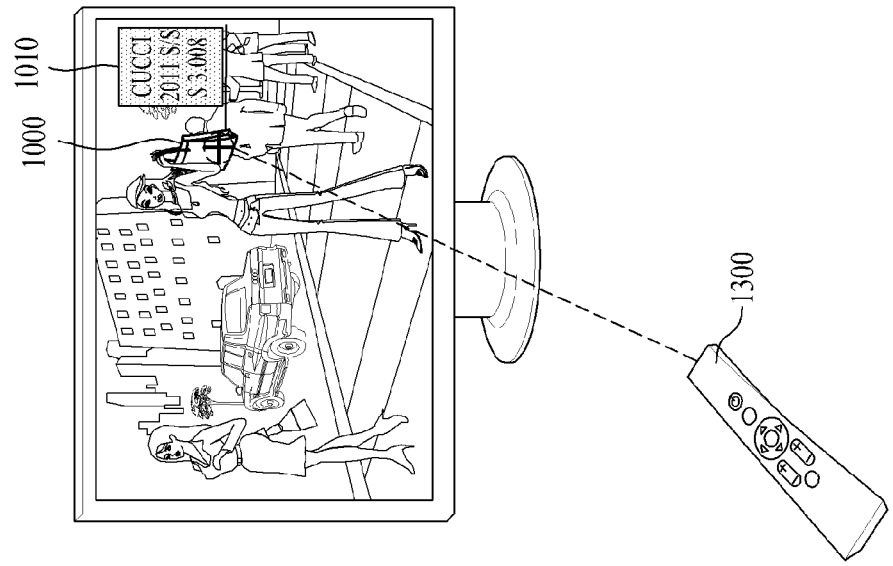
FIG. 10 is an overview illustrating displaying an object upon receiving a selection signal from the remote controller in the display device according to an embodiment of the present invention.
Figure 10:
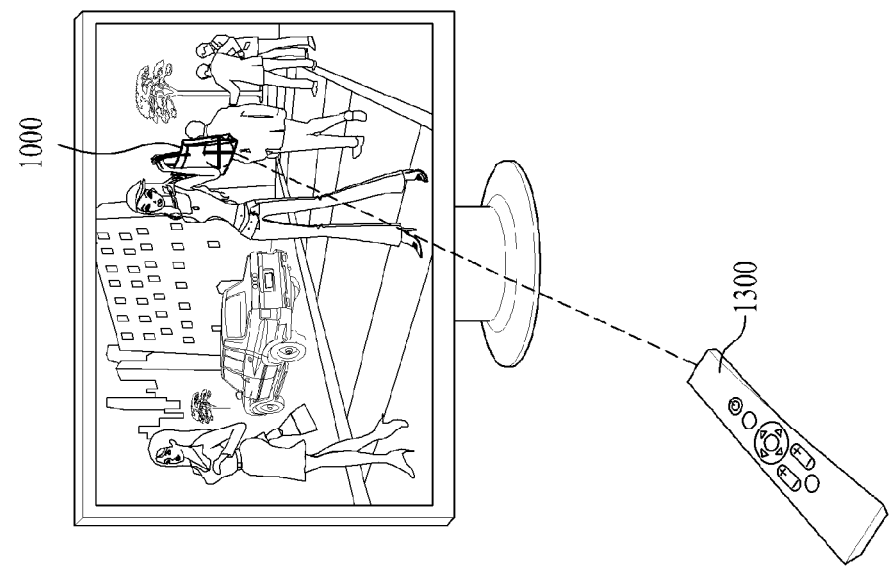

Next, FIG. 10 is an overview illustrating displaying an object upon receiving a selection signal from the remote controller 1300 in the display device according to an embodiment of the present invention. Upon receiving a selection signal from the remote controller 1300, the controller 150 determines whether an object is present in the region selected by the selection signal. Upon determining that an object is present in the region selected by the selection signal, the controller 150 may distinctively display the object 1000 so that a user can recognize the presence of the object 1000 as shown in FIG. 10(*a*). Specifically, the object 1000 is displayed with a bold border as shown in FIG. 10(*a*). Alternatively, the object 1000 may be displayed a in a flickering fashion or so that a region displaying the object 1000 has a different color. In addition, as shown in FIG. 10(*b*), meta data of the object 1000 may be displayed together with the object 1000.

Also, when a command signal received by the user interface corresponds to a fourth condition, the controller 150 can control a color, size, and amount of the displayed meta data to be changed in response to a motion of the remote controller. The fourth condition is that the motion of the remote controller 1300 recognized by the controller 150 is a fourth motion. The fourth motion may be a specific motion selected from all motions that can be performed through the remote controller 1300. Consequently, the fourth motion may be moving the remote controller 1300 in the vertical direction, moving the remote controller 1300 in the horizontal direction, rotating the remote controller 1300 in the clockwise direction or in the counterclockwise direction, or moving a pointer corresponding to the remote controller 1300 in the clockwise direction or in the counterclockwise direction. Also, the fourth motion may be drawing a specific shape. This will be described below with reference to FIG. 18.

Also, motion information set as the fourth motion may be stored in the memory 130, and the controller 150 can determine whether the motion information received from the user interface 160 corresponds to the stored motion information. In addition, the fourth condition may be a signal generated when a specific button of the remote controller 1300 is pushed or pressed. The fourth condition may also be changed according to preset information.

As an embodiment of changing the amount of the meta data, meta data regarding at least one object included in the displayed video data may be sequentially displayed. That is, the controller 150 may control meta data which has not yet displayed, starting from the meta data displayed according to the selection signal, to be sequentially displayed in predetermined order in response to the motion signal of the remote controller 1300.

Figure 11:
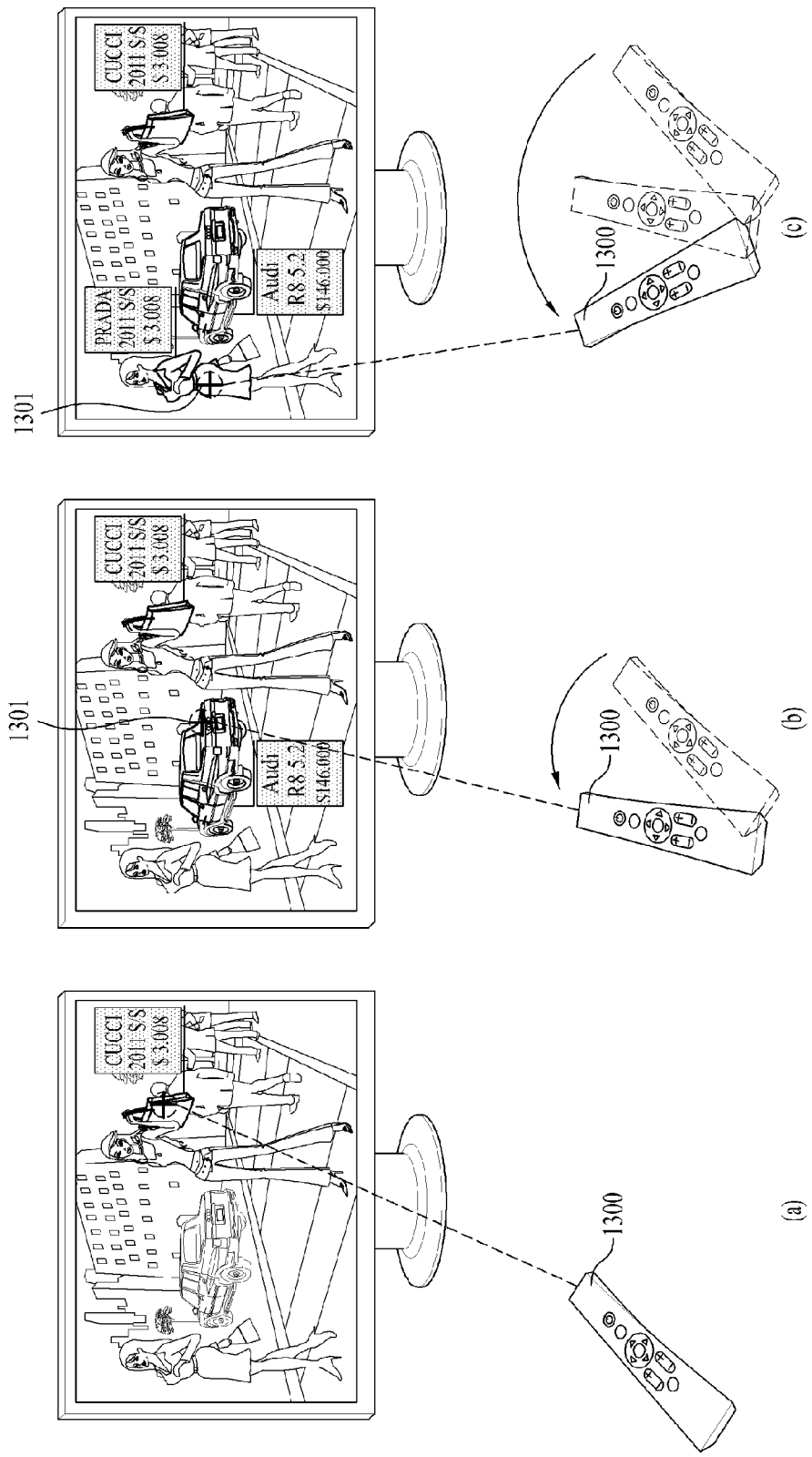
FIG. 11 is an overview illustrating sequentially displaying meta data in response to a motion of the remote controller in the display device according to an embodiment of the present invention.

FIG. 11 is an overview illustrating sequentially displaying meta data in response to a motion of the remote controller 1300 in the display device according to an embodiment of the present invention. In particular, FIG. 11(*a*) is an overview illustrating an object and meta data of the object being displayed according to a user selection signal. As shown in FIGS. 11(*b*) and 11(*c*), a pointer 1301 is moved in response to the motion of the remote controller 1300. The object and the meta data of the object may be controlled to be sequentially displayed from the right side to the left side according to the movement of the pointer 1301. Also, when the remote controller is moved in the direction reverse to the direction shown in FIG. 11, the meta data may be controlled to be sequentially undisplayed.

In the embodiment as shown in FIG. 11, the object and the meta data of the object are controlled to be sequentially displayed from the right side to the left side. However, a method of changing the display order is also possible according to the present invention.

Also, in FIG. 11, the pointer corresponding to the remote controller draws a portion of a circular pattern according to the motion of the remote controller is shown as an embodiment. Alternatively, the object or the meta data may be displayed in response to the motion for moving the remote controller in a predetermined pattern. For example, the predetermined pattern includes a pattern generated by at least one of the rotary, circular, and flip motions of the remote controller 1300, which was previously described with reference to FIG. 5.

Meanwhile, when graphic data corresponding to the meta data is displayed, a user may want to directly view detailed information of a corresponding commodity or work or to directly purchase the commodity or work according to the meta data. Since content is being reproduced, however, the user may want to view detailed information of the commodity or work or to directly purchase the commodity or work after the reproduction of the content is completed. In this instance, the user may want to separately store the meta data regarding the object and then view the stored meta data afterwards as in placing the commodity or work in a shopping cart at an online shopping mall.

When the user interface 160 receives a signal for selecting specific meta data from the remote controller 1300, the controller 150 can control a frame of the video data including the specific object to be store in the memory 130. The frame corresponds to an image which is being displayed in the video data. Further, the signal for selecting specific meta data may be a signal generated when a predetermined button of the remote controller 1300 is pushed or pressed on a region of the screen at which the meta data is displayed or a command signal through the predetermined motion.

Figure 12:
FIG. 12 is an overview illustrating displaying specific meta data stored in the display device according to an embodiment of the present invention.

Next, FIG. 12 is an overview illustrating displaying specific meta data stored in the display device according to an embodiment of the present invention. As shown in FIG. 12, the display unit 180 may display the stored at least one video data frame in the form of a page. When a user select meta data regarding a bag in the specific video data frame to be viewed after reproduction of the content is completed, graphic data corresponding to the meta data is stored together with the displayed video data frame. After reproduction of the content is completed, the stored video data frame and the graphic data is displayed in the form of a page of a sketchbook with reference to the memory 130.

Figure 13:
FIG. 13 is an overview illustrating another embodiment of displaying the specific meta data according to FIG. 12.

FIG. 13 is an overview illustrating another embodiment of displaying the specific meta data according to FIG. 12. As shown, when a command signal received by the user interface 160 corresponds to a fifth condition, the controller 150 can display the displayed video data frame in a page turning form in response to the received command signal.

Further, the fifth condition is that the motion of the remote controller 1300 recognized by the controller 150 is a fifth motion. The fifth motion may be a specific motion selected from all motions that can be performed through the remote controller 1300. For example, moving the remote controller 1300 to the right side to the left side may be set as the fifth motion. This motion is similar to the motion of an arm of the user when the user actually turns a page. Consequently, the user feels as if the page is actually turned, and therefore, the motion provides an interface accustomed to the user.

Figure 14:
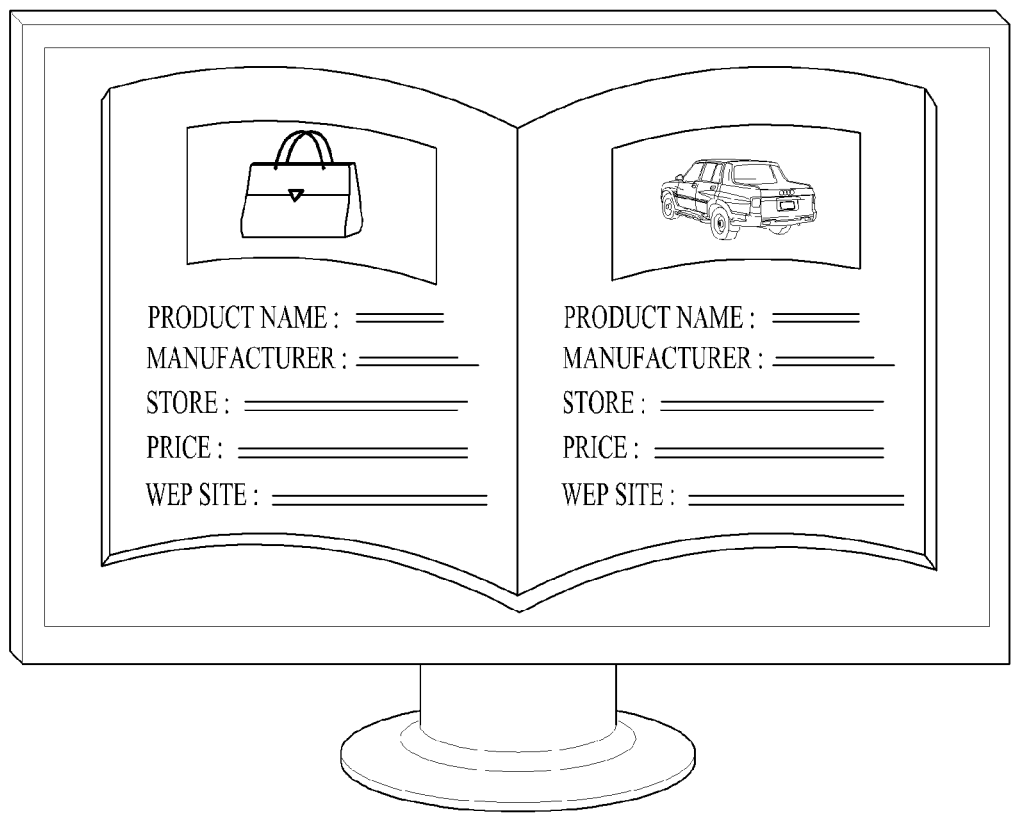
FIG. 14 is an overview illustrating another embodiment of displaying stored specific meta data in the display device according to an embodiment of the present invention.

FIG. 14 is an overview illustrating displaying stored specific meta data in the display device according to an embodiment of the present invention. Unlike FIG. 13, FIG. 14 shows that meta data is stored in an open page form so that graphic data corresponding to at least two meta data can be viewed at once, and a video data frame including the meta data is not displayed. This method is preferable when the number of stored specific meta data is great.

Figure 15:
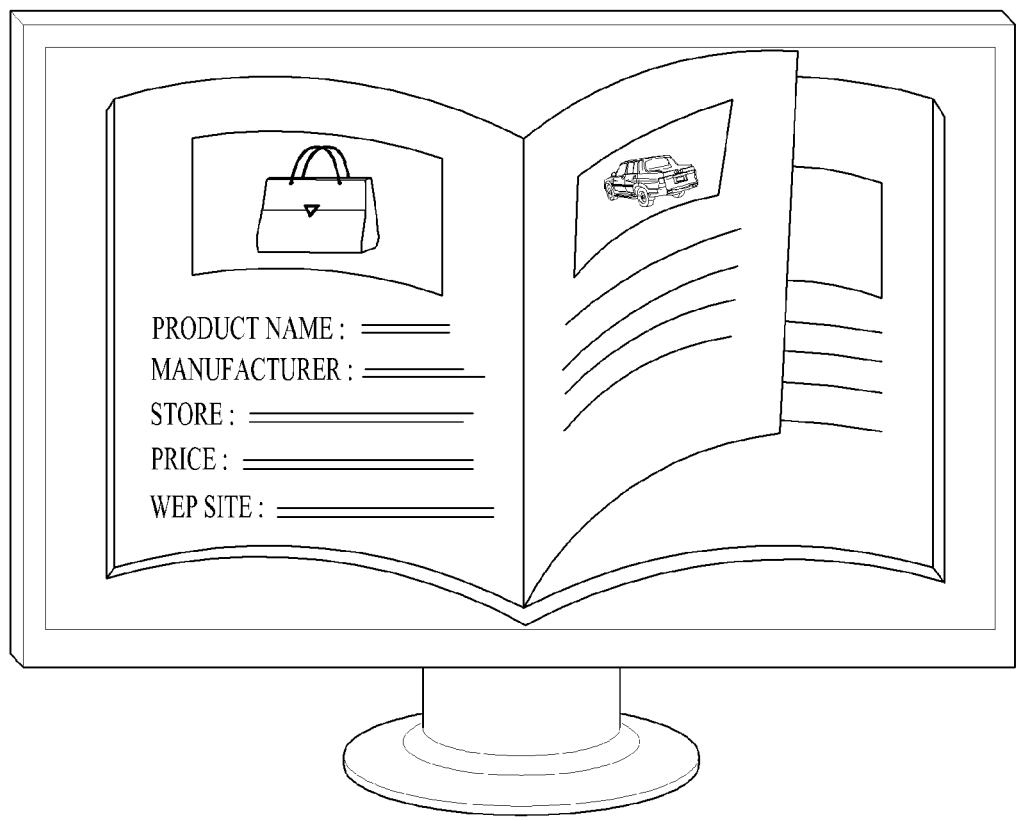
FIG. 15 is an overview illustrating another embodiment of displaying the specific meta data according to FIG. 14.

FIG. 15 is an overview showing another embodiment of displaying the specific meta data according to FIG. 14. When a command signal received by the user interface 160 corresponds to a fifth condition as previously described, the controller 150 displays the data in a page turning form as shown in FIG. 15 in response to the received command signal. The fifth condition may also be a signal generated when a specific button of the remote controller 1300 is pushed/pressed and can be changed according to preset information. The fifth condition was previously described with reference to FIG. 13.

As compared with FIG. 13, however, the object and the meta data of the object are displayed without the video data frame, whereby a user may feel as if he/she is reading a magazine. Also, only meta data regarding objects which the user takes interest in are stored, and therefore, when the meta data is advertisement information regarding a commodity, advertisement efficiency is improved. Further, the meta data is exposed to specific users who take interest in the meta data, thereby improving advertisement efficiency.

Consequently, graphic data corresponding to specific meta data is displayed, and when the graphic data is to be separately stored according to a request, the reproduction of content may be interrupted. This is because it is difficult to a user to concentrate upon content when graphic data corresponding to specific meta data is displayed, and therefore, the user wants the content to be reproduced after displaying and processing of the meta data is completed.

For a VOD service, therefore, a state in which the reproduction of content is interrupted is maintained, and after processing of the meta data is completed. Also, for a satellite broadcast, a time shift function is driven so that the reproduction of content watched by a user is interrupted. At this time, the display device records the satellite broadcast in real time, and after displaying and processing of the meta data is completed, the content can be reproduced starting from the next frame of the frame at which the reproduction of the content has been interrupted.

Meanwhile, the display device according to an embodiment of the present invention can determine whether a command signal received from the remote controller corresponds to a predetermined condition and adjust a range in which meta data is displayed based on the determination. In more detail, the remote controller and the display device can use a Bluetooth, radio frequency (RF) communication, infrared (IF) communication, ultra wideband (UWB), or ZigBee mode, which will hereinafter be described with reference to FIGS. 16 and 17.

Figure 16:
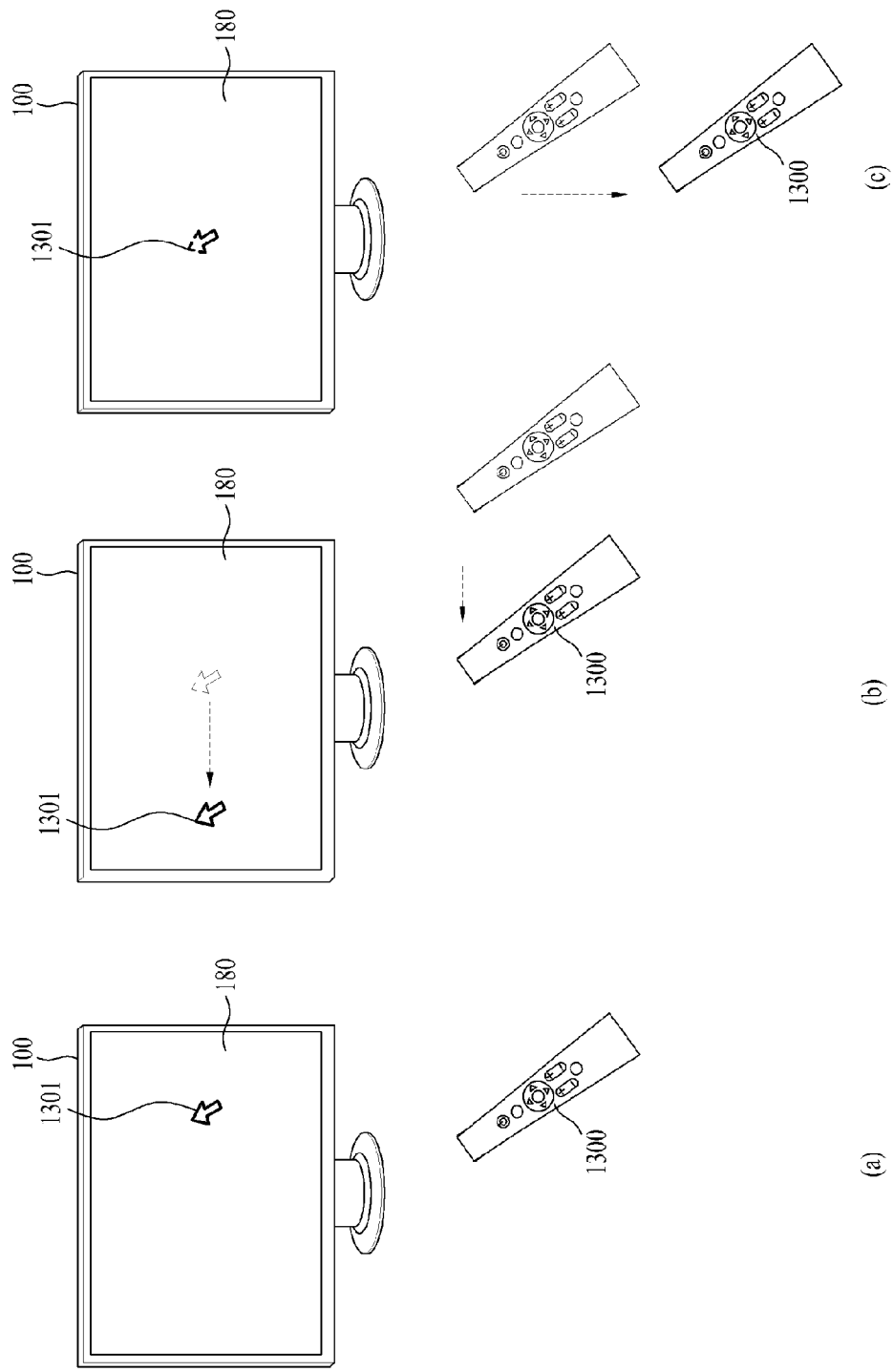
FIG. 16 is an overview illustrating the external appearance of a remote controller for controlling a display device according to an embodiment of the present invention.

In particular, FIG. 16 is an overview showing the external appearance of a remote controller 1300 for controlling a display device 100 according to an embodiment of the present invention. First, as shown in FIG. 16(*a*), a pointer 1301 corresponding to the remote controller 1300 is displayed on the display device 100. A display unit 180 shown in FIG. 16 corresponds to, for example, the display unit of the display device shown in FIG. 1.

Further, a user can move or rotate the remote controller 1300 upward and downward (FIG. 16(*a*)), from side to side (FIG. 16(*b*)), or backward and forward (FIG. 16(*c*)). The pointer 1301 displayed on the display unit 180 of the display device 100 correspond to a motion of the remote controller 1300. The remote controller 1300 may also be referred to as a space remote controller configured so that the pointer 1301 is moved and displayed according to a motion in a three-dimensional (3D) space as shown in the drawing. For example, FIG. 16(*b*) illustrates the use moving the remote controller 1300 to the left side, and the pointer 1301 moving to the left side in correspondence to the movement of the remote controller 1300.

Information regarding the motion of the remote controller 1300 sensed by a sensor of the remote controller 1300 is also transmitted to the display device 100. The display device 100 can then calculate coordinates of the pointer 1301 from the information regarding the motion of the remote controller 1300. The display device 100 can also display the pointer 1301 so that the pointer 1301 corresponds to the calculated coordinates.

The motion of the remote controller 1300 may also be recognized based on the information regarding the motion of the remote controller 1300 to determine whether the motion of the remote controller 1300 is a predetermined motion, which will be described below with reference to FIG. 17.

Further, FIG. 16(*c*) illustrates the user moving the remote controller 1300 away from the display unit 180 and a specific button of the remote controller 1300 being pushed. As a result, a selected region in the display unit 180 corresponding to the pointer 1301 can be zoomed in and enlarged. On the other hand, when the user moves the remote controller 1300 toward the display unit 180, a selected region in the display unit 180 corresponding to the pointer 1301 can be zoomed out and reduced. When the remote controller 1300 shown in FIG. 16 is used, therefore, it is possible to rapidly and conveniently select an object and view meta data on screen shown in FIGS. 2(*b*) and 7.

Figure 17:
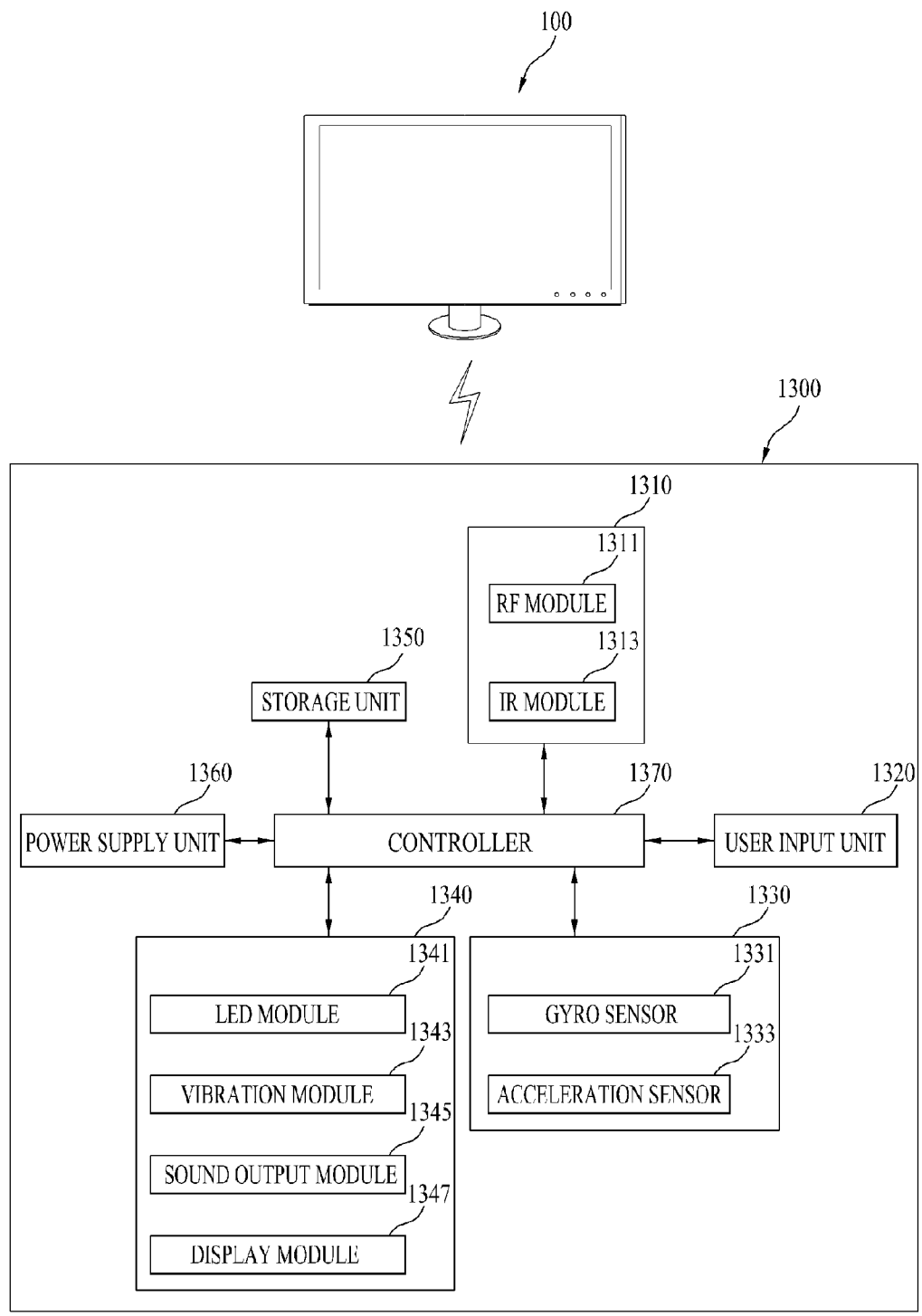
FIG. 17 is a block diagram of the remote controller shown in FIG. 16.

Next, FIG. 17 is a block diagram of the remote controller 1300 shown in FIG. 16. As shown in FIG. 17, the remote controller 1300 may include a wireless communication unit 1310, a user input unit 1320, a sensor unit 1330, an output unit 1340, a storage unit 1350, a power supply unit 1360, and a controller 1370.

The wireless communication unit 1310 transmits and receives a signal to and from the display device 100 according to the embodiment of the present invention as described above. The wireless communication unit 1310 may include an RF module 1311 for transmitting and receiving a signal to and from the display device 100 according to RF communication standards and an IR module 1313 for transmitting and receiving a signal to and from the display device 100 according to IR communication standards.

In this embodiment, the remote controller 1300 may transmit a signal containing information regarding a motion of the remote controller 1300 to the display device 100, and receive a signal transmitted by the display device 100, through the RF module 1311. Also, the remote controller 1300 may transmit a command for power on/off, channel change, or a volume change to the display device 100 through the IR module 1313, as needed.

When the remote controller 1300 transmits and receives a signal to and from the display device 100 through the RF module 1311 in a wireless fashion, the remote controller 1300 and the display device 100 transmit and receive a signal to and from each other using a predetermined frequency band.

Further, the user input unit 1320 may be realized by a keypad, a button, a touchpad, or a touchscreen. The user can manipulate the user input unit 1320 to input a command related to the display device 100 into the remote controller 1300. The sensor unit 1330 is configured to chase or track a motion of the remote controller 1300. The sensor unit 1330 may include a gyro sensor 1331 or an acceleration sensor 1333. The gyro sensor 1331 outputs an electric signal according to two-axis or thee-axis position change generated from the motion of a body of the remote controller 1300. Further, the acceleration sensor 1333 outputs an electric signal according to two-axis or thee-axis acceleration generated from the motion of the remote controller 1300.

For example, the gyro sensor 1331 can sense information regarding the motion of the remote controller 1300 on the basis of x, y, and z axes, and the acceleration sensor 1333 can sense information regarding movement velocity of the remote controller 1300. Also, the sensor unit 1330 may further include a distance measurement sensor for sensing the distance between the remote controller 1300 and the display device 100, and an operation processing circuit for operating electric signals output from the respective sensors.

The operation processing circuit may operate the displacement and velocity of the body of the remote controller 1330 according to electric signals successively output from the gyro sensor 1331 or the acceleration sensor 1333, and output the operated displacement and velocity of the body of the remote controller 1330 to the controller 1370. Further, the operation processing circuit may not be mounted in the sensor unit but may be mounted in the controller 1370.

In addition, the output unit 1340 can output a video or audio signal corresponding to the manipulation of the user input unit 1320 or a signal transmitted from the display device 100. A user can recognize whether the user input unit 1320 has been manipulated or whether display device 100 has been controlled through the output unit 1340. For example, the output unit 1340 may include an light emitting diode (LED) module 1341 configured to be lit when the user input unit 1320 is manipulated or when a signal is transmitted and received between the remote controller 1300 and the display device 100 through the wireless communication unit 1310, a vibration module 1343 for generating vibration, a sound output module 1345 for outputting a sound, or a display module 1347 for outputting a video.

The storage unit 1350 can store various kinds of programs necessary for control or motion of the remote controller 1300 and application data. Also, the storage unit 1350 can store information regarding specific motions, such as a first motion, a second motion, and a third motion, of the remote controller 1300.

When motion information is separately stored in the remote controller 1300 as described above, the display device 100 can directly receive a command signal based on the motion information without recognizing the motion of the remote controller 1300 using a signal transmitted from the remote controller 1300. That is, the display device 100 can directly receive a command signal regarding a specific one of the first, second, third, fourth, and fifth motions from the remote controller 1300.

When the storage unit 1350 stores information regarding a specific motion, the user input unit 1320 may include a motion start button for transmitting a signal regarding the motion through the sensor unit 1330. The motion start button may be selectively provided in the remote controller 1300. When the motion start button is separately provided, the motion start button may be configured to perform command input through the motion of the body of the remote controller 1300 after a user pushes the motion start button once.

That is, the display device 100 receives a signal regarding the motion of the remote controller 1300 only upon receiving a signal regarding the motion start button. Also, in another embodiment, the remote controller 1300 may be configured to transmit a motion signal according to the motion of the remote controller 1300 only when the motion start button is pushed.

Further, the power supply unit 1360 supplies power to the remote controller 1300. When the remote controller 1300 is not moved for a predetermined time, the power supply unit 1360 stops the supply of power to the remote controller 1300 to reduce power consumption. The power supply unit 1360 may resume the supply of power to the remote controller 1300 when a predetermined key provided on the remote controller 1300 is manipulated.

In addition, the controller 1370 controls overall operations of the remote controller 1300. The controller 1370 can transmit a signal corresponding to predetermined key manipulation of the user input unit 1320 or a signal corresponding to the motion of the remote controller 1300 sensed by the sensor unit 1330 to the display device 100 through the wireless communication unit 1310.

In particular, the controller 1370 is designed to control the RF module 1311 or the IR module 1313 so that an input signal for selecting one of objects displayed on the display unit 180 of the display device 100 or one of graphic data corresponding to meta data is transmitted to the display device 100.

Because it is possible to transmit a command signal according to the motion of the remote controller 1300 as previously described, the present invention has an advantage because it is possible to accurately select one of adjacent regions. Also, it is possible for a user to easily and conveniently adjust the transparency of meta data according to the motion of the remote controller 1300 using the gyro sensor 1331 or the acceleration sensor 1333 of the remote controller 1300, which will hereinafter be described with reference to FIGS. 18 to 20.

Figure 18:
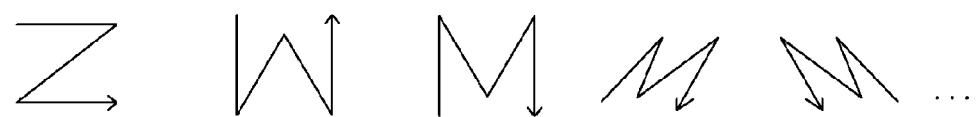
FIG. 18 is an overview illustrating a command signal corresponding to a first condition transmitted from the remote controller according to an embodiment of the present invention.

In particular, FIG. 18 is an overview illustrating a command signal corresponding to a first condition transmitted from the remote controller according to an embodiment of the present invention. When, as an embodiment, the first condition is a command signal according to shaking the remote controller, the shaking motion may be recognized as a command signal as shown in FIG. 18. When the shaking motion corresponds to the first condition, a first region having meta data and a second region having no meta data is separately displayed as previously described with reference to FIG. 2.

Figure 19:
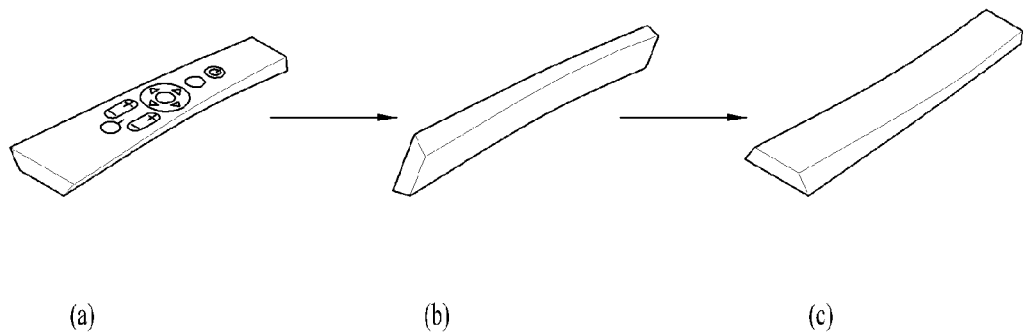
FIG. 19 is an overview illustrating transmitting a command signal corresponding to a third condition from the remote controller according to an embodiment of the present invention.

FIG. 19 is an overview illustrating transmitting a command signal corresponding to a third condition from the remote controller according to an embodiment of the present invention. When, as an embodiment, the third condition is a command signal according to rotating the remote controller, a signal according to the motion for rotating the remote controller is transmitted. FIG. 19(*a*) shows a rotation angle of 0 degrees before rotation of the remote controller. When the rotation angle starts increasing as shown in FIG. 19(*b*) and the remote controller is rotated by the maximum rotation angle, i.e. 180 degrees, as shown in FIG. 19(*c*), the controller can determine that the rotation of the remote controller has been completed. Further, the maximum rotation angle may be set to 90 degrees or 360 degrees as previously described.

Figure 20:
FIG. 20 is an overview illustrating a command signal corresponding to the third condition transmitted from the remote controller according to FIG. 19.

FIG. 20 is an overview illustrating a command signal corresponding to the third condition transmitted from the remote controller according to FIG. 19. The rotation motion may be recognized as a command signal as shown in FIG. 20. FIG. 20(*a*) shows a command signal generated when the remote controller is rotated in the counterclockwise direction, and FIG. 20(*b*) shows a command signal generated when the remote controller is rotated in the clockwise direction.

Meanwhile, the remote controller may be one of the remote controllers of existing televisions or a motion remote controller. Also, the remote controller may be a mobile device having an application for realizing a motion remote controller function installed therein.

Figure 21:
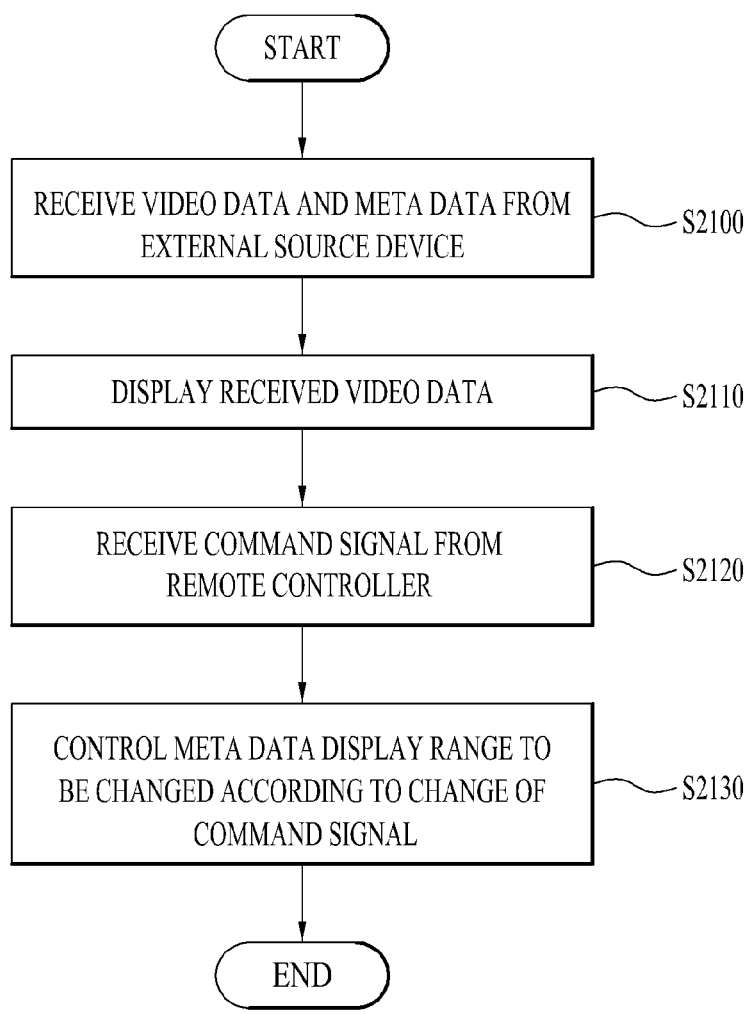
FIG. 21 is a flow chart illustrating a control method of a display device according to an embodiment of the present invention.

Next, FIG. 21 is a flow chart illustrating a control method of a display device according to an embodiment of the present invention. First, video data and meta data are received from an external source device (S2100). The external source device includes a terrestrial or cable broadcasting server, a content server, and a content-related advertisement providing server. Also, the video data is content-related data provided by the external source device. The video data includes digital data provided through various kinds of wired and wireless communication networks as well as movies, dramas, music videos, and games. The video data may also be received through a video on demand (VOD) service.

The meta data includes advertisement data, content data, guidance data, and supplemental data regarding an object predetermined for each frame of the video data. Consequently, a thing such as a person, place, or commodity including meta data contained in video data for advertising to users or providing detailed information to the users is called an object. Meta data is matched and stored with each object included in the video data. As a result, all things such as a place, music, person, and commodity, which can be displayed by video data may be an object. Meta data such as supplemental data and guidance data regarding the object may also be stored.

The received video data is displayed (S2110), and a command signal from the remote controller is received during display of the video data (S2120). The command signal is generated when the remote controller is moved in a predetermined pattern. The predetermined pattern includes a pattern generated by at least one of the rotary, circular, and flip motions of the remote controller, which was previously described with reference to FIGS. 4 and 18 to 20.

A meta data display range is then changed according to the change of the command signal (S2130). As discussed above, the command signal is a signal generated in response to the motion of the remote controller. As a first embodiment of controlling the meta data display range to be changed according to the change of the command signal, meta data corresponding to an object included in the displayed video data may be sequentially displayed or undisplayed in predetermined order as shown in FIG. 11. That is, the amount of meta data to be displayed is controlled to be increased or decreased according to the motion of the remote controller, and the order in which met data is displayed or undisplayed may be changed while the amount of meta data to be displayed is controlled to be increased or decreased.

A second embodiment of controlling the meta data display range to be changed according to the change of the command signal was previously described with reference to FIGS. 2 and 3. That is, when the command signal corresponds to a first condition, an object included in the video data which is displayed may be separately displayed. When the command signal corresponds to a second condition, meta data corresponding to the object may be displayed.

The first and second conditions corresponding to the first and second motions was discussed above in detail. For example, the first or second motions may be moving the remote controller in the vertical direction, moving the remote controller in the horizontal direction, rotating the remote controller in the clockwise direction, or rotating the remote controller in the counterclockwise direction. The first motion or the second motion may also be changed according to preset information.

A third embodiment of controlling the meta data display range to be changed according to change of the command signal was previously described with reference to FIGS. 4 and 6. That is, when the command signal corresponds to a third condition, the transparency of the displayed meta data can be controlled to be changed in response to the motion of the remote controller.

Also, as a fourth embodiment of controlling the meta data display range to be changed according to change of the command signal, when the command signal corresponds to a fourth condition, a color, size, and amount of the displayed meta data may be controlled to be changed in response to the motion of the remote controller.

The third and fourth conditions corresponding to the third and further motions is discussed above. Also, when a signal for selecting a specific region in the displayed video data is received from the remote controller as previously described with reference to FIG. 10, the controller can determine whether an object is present in the specific region, and upon determining that the object is present in the specific region, display meta data corresponding to the object. In this instance, meta data is provided only to objects which a user takes interest in, thereby preventing the user from being exposed to unnecessary information.

Figure 22:
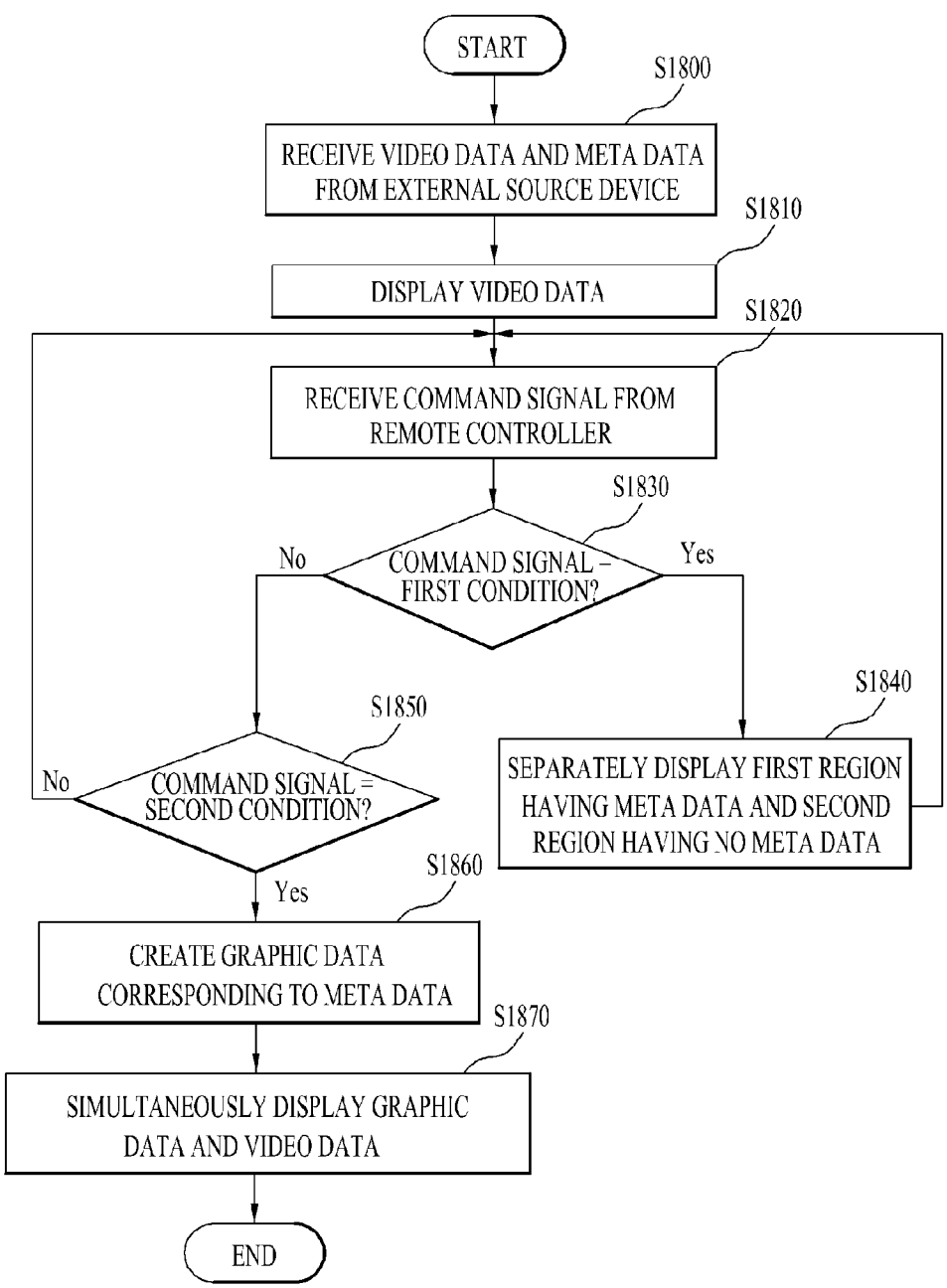
FIG. 22 is a flow chart illustrating a control method of a display device according to another embodiment of the present invention.

Next, FIG. 22 is a flow chart showing a control method of a display device according to another embodiment of the present invention. First, video data and meta data are received from an external source device (S1800). The external source device includes a terrestrial or cable broadcasting server, a content server, and a content-related advertisement providing server. The video data is data for displaying content provided by the external source device, and the meta data is data regarding supplemental information and advertisement information related to the video data.

The received video data is displayed (S1810), and a command signal from the remote controller is received (S1820). The controller determines whether the received command signal is a first condition (S1830). Upon determining that the command signal is the first condition (Yes in S1830), the controller separately displays a first region having the meta data and a second region not having the meta data (S1840). For example, the meta data may be displayed near the objects, displayed as a separate page or pages, etc.

Each frame of the video data may also include advertisement information or supplemental information regarding a person, commodity, and place displayed in the frame. An object having such advertisement information or supplemental information can thus be separately displayed using a bold border or a different color as a first region so that the object is distinguished from the remaining second region.

As objects are separately displayed as described above, the user can determine whether there is information regarding a commodity which the user is interest in, thereby easily determining whether the user will continuously watch content or view meta data.

Upon determining that the command signal is not the first condition (No in S1830), the controller determines whether the received command signal is a second condition (S1850). Upon determining that the command signal is not the second condition (No in S1850), a command signal from the remote controller is received during continuous reproduction of the content. On the other hand, upon determining that the command signal is the second condition (Yes in S1850), graphic data corresponding to the meta data is created (S1860), and the created graphic data and the received video data is simultaneously displayed (S1870).

When the created graphic data and the received video data is simultaneously displayed, however, a portion of the video data is hidden by the graphic data. When the received command signal is a third condition, therefore, the transparency of the graphic data corresponding to the meta data is adjusted to solve the above problem.

The third condition may be that the received command signal is a motion signal generated when the remote controller is rotated in the clockwise direction or in the counterclockwise direction. The motion signal may be generated by rotating the body of the remote controller about the middle thereof.

Figure 23:
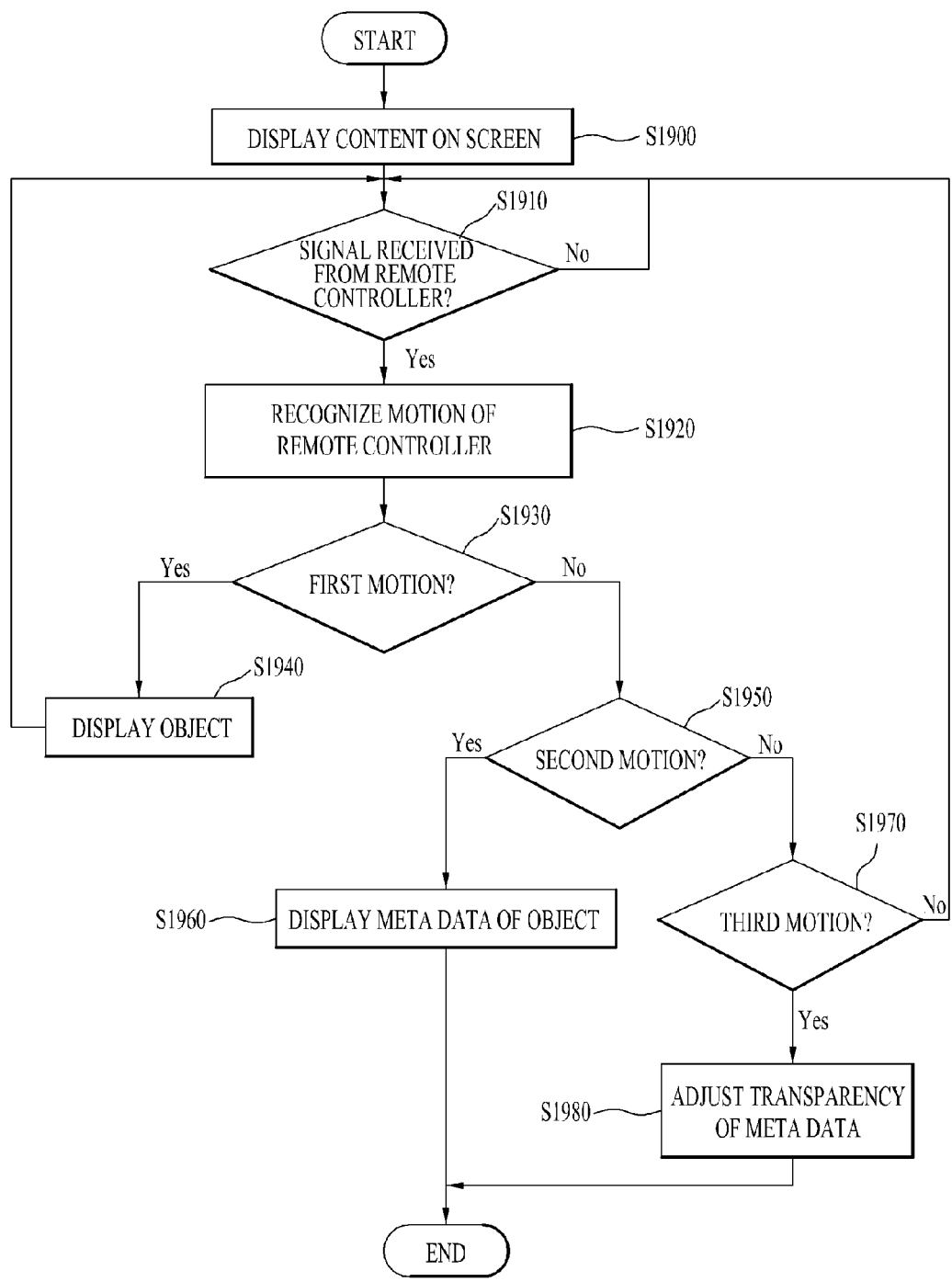
FIG. 23 is a flow chart illustrating a control method of a display device according to a further embodiment of the present invention.

Next, FIG. 23 is a flow chart showing a control method of a display device according to a further embodiment of the present invention. Content received from an external source device is displayed on a screen (S1900). The content includes video data for displaying the content and meta data including supplemental information and advertisement information related to the video data.

Upon receiving a signal from the remote controller (S1910), a motion of the remote controller is recognized using the received signal (S1920). Since the gyro sensor or the acceleration sensor is provided in the sensor unit of the remote controller as previously described, it is possible to transmit a signal regarding the motion of the remote controller and to receive such a signal through the user interface of the display device.

The controller determines whether the recognized motion is a first motion (S1930). Upon determining that the recognized motion is the first motion (Yes in S1930), an object is displayed (S1940). Since the first motion is displaying the object, it is preferable for the first motion to be set as a simple motion, such as shaking or rotating the remote controller or pushing a specific button of the remote controller.

As previously described, the object includes meta data contained in content, i.e. video data, for advertising to users or providing detailed information and link information to the users. Consequently, all things included in the video data such as a place, music, person, and commodity, in the picture which is being displayed may become an object.

Upon determining that the recognized motion is not the first motion (No in S1930), the controller determines whether the recognized motion is a second motion (S1950). Upon determining that the recognized motion is the second motion (Yes in S1950), meta data of the object are displayed (S1960). A specific motion selected from the motions may be set as the second motion.

Upon determining that the recognized motion is not the second motion (No in S1950), the controller determines whether the recognized motion is a third motion (S1970). Upon determining that the recognized motion is not the third motion (No in S1970), a signal from the remote controller is received. On the other hand, upon determining that the recognized motion is the third motion (Yes in S1970), the transparency of the meta data is adjusted in response to the third motion (S1980).

Figure 24:
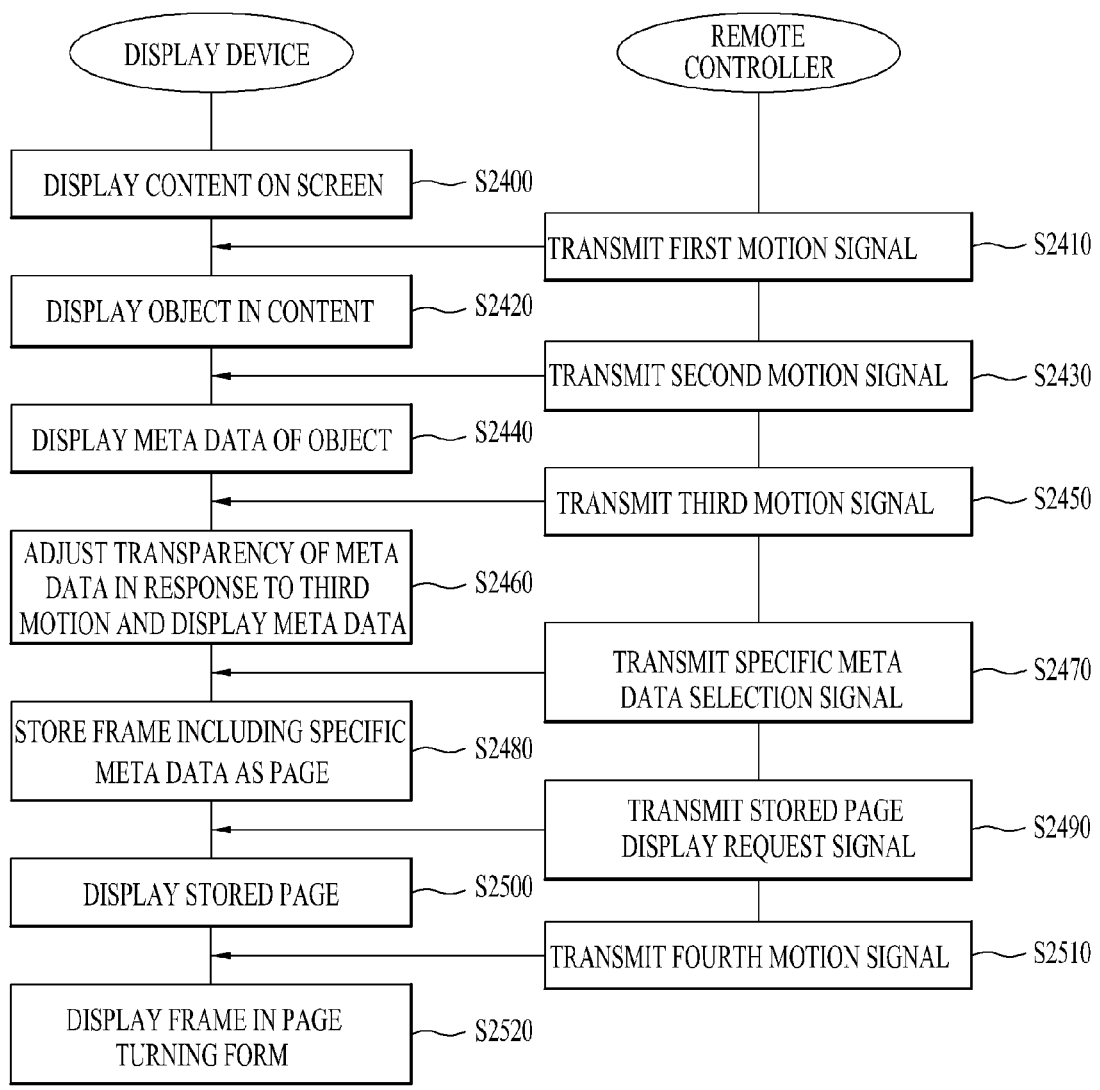
FIG. 24 is a flow chart illustrating a data transmission protocol between a display device and a remote controller according to an embodiment of the present invention.

FIG. 24 is a flow chart showing a data transmission protocol between a display device and a remote controller according to an embodiment of the present invention. Content is displayed on a screen of the display device (S2400). When a first motion signal is transmitted from the remote controller (S2410), the display device determines whether the first motion corresponds to a first condition, and separately displays an object in the content (S2420). The object and separately displaying the object were previously described.

When a second motion signal is transmitted from the remote controller (S2430), the display device determines whether the second motion corresponds to a second condition, and displays meta data of the object (S2440). When a third motion signal is transmitted from the remote controller (S2450), the display device determines whether the third motion corresponds to a third condition, and adjusts the transparency of the meta data in response to the third motion (S2460). As the transparency of the meta data is increased, the meta data can be overlapped with the content, i.e. video data of the content.

When a selection signal for selecting specific meta data is transmitted from the remote controller (S2470), a frame of the content including the specific meta data is stored in the memory (S2480). As information regarding a person or commodity that a user takes interest in is stored during reproduction of the content as described above, it is possible for the user to watch the content without discontinuity during use of the content.

When a stored page display request signal to view separately stored meta data is transmitted from the remote controller (S2490), a frame of the stored content is displayed in the form of a page with reference to the memory (S2500). The frame may be converted into the form of a page and then stored during storage of the frame. Alternatively, the frame may be converted into the form of a page and then displayed before display of the frame.

When a fourth motion signal is transmitted from the remote controller (S2510), the display device determines whether the fourth motion corresponds to a fourth condition, and displays a video data frame of the displayed content in a page turning form (S2520). Thus, at least one meta data may be selected and stored, and the stored meta data may be displayed in the form of a page according to user request. As a result, a user can intensively view matters which the user takes interest in. In addition, the user can feel as if he/she views a magazine although he/she is watching a TV. Consequently, a degree of user involvement is further improved.

Also, manipulation is easy and convenient, and therefore, it is possible to provide a user environment in which users can easily and conveniently use the display device and the remote controller irrespective of age and learning ability.

For the convenience of description, embodiments were described with reference to the respective drawings; however, the embodiments shown in the respective drawings may be combined to realize a new embodiment. Also, it is possible to design recording media that can be read by a computer having a program for executing the above-described embodiments installed therein as needed by those skilled in the art. Such combination or design falls within the right scope of the present invention.

The display device according to an embodiment of the present invention and the control method of the same are not applied to restrict constructions and methods of the embodiments as described above, but all or some of the embodiments may be selectively combined so that the embodiments can be variously modified.

Meanwhile, the control method of the display device according to an embodiment of the present invention may be realized by a code written in recording media configured to be read by a processor included in a network device so that the code can be read by the processor. The recording media configured to be read by the processor include all kinds of recording devices for storing data that can be read by the processor. Examples of the recording media configured to be read by the processor may include a read only memory (ROM), a random access memory (RAM), compact disc read only memory (CD-ROM), a magnetic tape, a floppy disc, and an optical data storage device. Also, the recording media may be realized in the form of a carrier wave, such as transmission through the Internet. Also, the recording media configured to be read by the processor may be distributed to computer systems connected to each other through a network so that a code which can be read by the processor is stored or executed in a distribution mode.

According to an embodiment of the present invention, it is possible to confirm whether meta data is included in the content displayed in the display device through a simple motion using the remote controller so that a user can view advertisement as needed, thereby reducing indiscreet expose to advertisement.

According to another embodiment of the present invention, it is possible to adjust display order, amount, and the transparency of meta data through a simple motion using the remote controller, thereby easily and conveniently viewing the meta data without disturbance in use of the content.

According to another embodiment of the present invention, it is possible to define a data transmission protocol between the remote controller and the display device for adjusting display order, amount, and the transparency of meta data included in the content through a motion using the remote controller.

According to a further embodiment of the present invention, it is possible to separately store meta data included in the content and to view only the stored meta data in the form of a magazine, thereby improving user convenience and advertisement efficiency.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of controlling a display device, the method comprising:
 receiving, via a receiving device, video data and meta data corresponding to the video data from an external source device;
 displaying, on a display of the display device, the received video data;
 receiving, via a controller, a first and a second motion command signal from a remote controller associated with the display device, wherein the first and second motion command signals include a first condition and a second condition, respectively;
 selectively displaying meta data corresponding to at least one object included in the displayed video data on the display in accordance with a particular motion of the remote controller identified by the first and second motion command signals,
 wherein when the first motion command signal includes the first condition, the first condition being a shaking motion of the remote controller, the selectively displaying separately displays a first region having the meta data and a second region not having the meta data, and
 wherein when the second motion command signal includes the second condition, the second condition being a flip motion of the remote controller, graphic data corresponding to the meta data is created and the created graphic data and the received video data are simultaneously displayed;
 receiving, via the controller, a third motion command signal from the remote controller;
 adjusting a transparency of the meta data in response of the third motion command signal and displaying the adjusted transparency of the meta data;
 receiving, via the controller, a specific meta data selection signal from the remote controller;
 storing a frame including specific meta data as a page in response to the specific meta data selection signal;
 receiving, via the controller, a stored page display request signal from the remote controller;
 displaying the stored page on the display;
 receiving, via the controller, a fourth motion command signal from the remote controller; and
 displaying the frame in a page turning form on the display in response to the received fourth motion command signal.

2. The method of claim 1, wherein the first, second, third and fourth motion command signals of the remote controller are generated when the remote controller is moved in a predetermined pattern.

3. The method of claim 2, wherein the predetermined pattern includes rotary, circular, and flip motions of the remote controller.

4. The method of claim 1, wherein the selectively displaying the meta data includes sequentially displaying or undisplaying the meta data of said at least one object included in the displayed video data in a predetermined order.

5. The method of claim 1, wherein the selectively displaying the meta data includes:
 changing a color, size, and amount of the displayed meta data in accordance with the particular motion of the remote controller, when another command signal is received from the remote controller.

6. The method of claim 1, further comprising:
 receiving, via the controller, a signal indicating a selection of a specific region in the displayed video data from the remote controller;
 determining, via the controller, whether the at least one object is present in the specific region; and
 displaying the meta data corresponding to the at least one object upon determining that the object is present in the specific region.

7. The method of claim 1, wherein the external source device includes at least one of a terrestrial or cable broadcasting server, a content server, and a content-related advertisement providing server.

8. The method of claim 1, wherein the meta data corresponding to the at least one object includes purchase information for purchasing the at least one object.

9. A display device, comprising:
 a receiving device configured to receive video data and meta data corresponding to the video from an external source device;
 a display configured to display the received video data; and
 a controller configured to:
 receive a first and a second motion command signal from a remote controller associated with the display device, wherein the first and second motion command signals include a first condition and a second condition, respectively,
 selectively display meta data corresponding to at least one object included in the displayed video data on the display in accordance with a particular motion of the remote controller identified by the first and second motion command signals,
 wherein when the first motion command signal includes the first condition, the first condition being a shaking motion of the remote controller, the controller separately displays a first region having the meta data and a second region not having the meta data, and
 wherein when the second motion command signal includes the second condition, the second condition being a flip motion of the remote controller, the controller creates graphic data corresponding to the meta data and simultaneously displays the created graphic data and the received video data on the display,
 receive a third motion command signal from the remote controller,
 adjust a transparency of the meta data in response of the third motion command signal and display the adjusted transparency of the meta data,
 receive a specific meta data selection signal from the remote controller,
 store a frame including specific meta data as a page in response to the specific meta data selection signal,
 receive a stored page display request signal from the remote controller,
 display the stored page on the display,
 receive a fourth motion command signal from the remote controller, and
 display the frame in a page turning form on the display in response to the received fourth motion command signal.

10. The display device of claim 9, wherein the first, second, third and fourth motion command signals of the remote controller are generated when the remote controller is moved in a predetermined pattern.

11. The display device of claim 10, wherein the predetermined pattern includes rotary, circular, and flip motions of the remote controller.

12. The display device of claim 9, wherein the controller is further configured to selectively display the meta data by sequentially displaying or undisplaying the meta data of said at least one object included in the displayed video data in a predetermined order.

13. The display device of claim 9, wherein the controller is further configured to selectively display the meta data by changing a color, size, and amount of the displayed meta data in accordance with the particular motion of the remote controller, when another command signal is received from the remote controller.

14. The display device of claim 9, wherein the controller is further configured to:
- receive a signal indicating a selection of a specific region in the displayed video data from the remote controller,
- determine whether the at least one object is present in the specific region, and
- display the meta data corresponding to the at least one object upon determining that the object is present in the specific region.

15. The display device of claim 9, wherein the external source device includes at least one of a terrestrial or cable broadcasting server, a content server, and a content-related advertisement providing server.

16. The display device of claim 9, wherein the meta data corresponding to the at least one object includes purchase information for purchasing the at least one object.

* * * * *